(12) United States Patent
Ko et al.

(10) Patent No.: US 11,445,097 B2
(45) Date of Patent: Sep. 13, 2022

(54) APPARATUS AND METHOD FOR PROVIDING ILLUMINATION OF CAMERA IN ELECTRONIC DEVICE

(71) Applicant: Samsung Electronics Co., Ltd., Gyeonggi-do (KR)

(72) Inventors: Juhyun Ko, Gyeonggi-do (KR); Sooyoun Park, Gyeonggi-do (KR); Youngseok Park, Gyeonggi-do (KR); Donghwan Bae, Gyeonggi-do (KR); Minsuk Jang, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/060,867

(22) Filed: Oct. 1, 2020

(65) Prior Publication Data

US 2021/0105389 A1 Apr. 8, 2021

(30) Foreign Application Priority Data

Oct. 7, 2019 (KR) .................... 10-2019-0123741

(51) Int. Cl.
*H04N 5/225* (2006.01)
*G06F 1/16* (2006.01)
*H04N 5/232* (2006.01)

(52) U.S. Cl.
CPC ......... *H04N 5/2256* (2013.01); *G06F 1/1616* (2013.01); *G06F 1/1641* (2013.01);
(Continued)

(58) Field of Classification Search
None
See application file for complete search history.

(56) References Cited

U.S. PATENT DOCUMENTS 9,565,366 B2 * 2/2017 Yamazaki ............ H04N 5/2256
10,264,184 B2 * 4/2019 Yamazaki ............. G06F 1/1652
(Continued)

FOREIGN PATENT DOCUMENTS

| CN | 109302512 | 2/2019 |
| KR | 10-2015-0085402 | 7/2015 |
| KR | 1020190098340 | 8/2019 |

OTHER PUBLICATIONS

International Search Report dated Jan. 13, 2021 issued in counterpart application No. PCT/KR2020/013458, 8 pages.

*Primary Examiner* — Cynthia Segura
(74) *Attorney, Agent, or Firm* — The Farrell Law Firm, P.C.

(57) ABSTRACT

An electronic device and control method thereof capable of utilizing a display as illumination light for a camera that is being used to capture images is provided. The electronic device includes a foldable display; a camera; a processor; and a memory operatively connected to the processor, wherein the memory may store instructions that cause, when executed, the processor to detect a user input for activating the camera; identify a state of the foldable display based on the user input; display a live view of an object obtained by the camera through a designated region of the foldable display based on a first state of the foldable display; divide the foldable display into a first region for a live view and a second region for a lighting plate with respect to a folding site based on a second state of the foldable display; display a live view of an object obtained by the camera based on the first region; and output illumination light based on the second region.

18 Claims, 27 Drawing Sheets

(52) U.S. Cl.
CPC ....... *H04N 5/2257* (2013.01); *H04N 5/22525* (2018.08); *H04N 5/232935* (2018.08); *H04N 5/232939* (2018.08)

(56) References Cited

U.S. PATENT DOCUMENTS

| | | | | |
|---|---|---|---|---|
| 10,771,662 | B2* | 9/2020 | Yamazaki | H04N 5/22525 |
| 11,228,669 | B2* | 1/2022 | Jang | H04M 1/72442 |
| 2011/0241998 | A1* | 10/2011 | Mckinney | H04M 1/0247 |
| | | | | 345/204 |
| 2012/0235894 | A1* | 9/2012 | Phillips | G06F 1/1652 |
| | | | | 345/156 |
| 2013/0148002 | A1* | 6/2013 | Kim | H04N 5/232933 |
| | | | | 348/333.08 |
| 2013/0314581 | A1* | 11/2013 | Kido | H04N 5/23219 |
| | | | | 348/333.12 |
| 2013/0321340 | A1* | 12/2013 | Seo | G06F 3/04883 |
| | | | | 345/174 |
| 2015/0022561 | A1* | 1/2015 | Ikeda | G09G 3/20 |
| | | | | 345/690 |
| 2015/0146069 | A1* | 5/2015 | Yamazaki | H04N 5/2256 |
| | | | | 348/333.01 |
| 2015/0163410 | A1* | 6/2015 | Yamazaki | H04N 5/2354 |
| | | | | 348/333.11 |
| 2015/0201130 | A1* | 7/2015 | Cho | H04N 5/232935 |
| | | | | 348/333.05 |
| 2015/0222880 | A1* | 8/2015 | Choi | H04N 13/302 |
| | | | | 348/43 |
| 2015/0365590 | A1* | 12/2015 | Ishizuka | G06F 3/012 |
| | | | | 348/211.99 |
| 2016/0085319 | A1* | 3/2016 | Kim | G06F 3/04847 |
| | | | | 345/156 |
| 2017/0017313 | A1* | 1/2017 | Rakshit | G06F 1/1652 |
| 2017/0052566 | A1* | 2/2017 | Ka | G06F 1/1694 |
| 2018/0067598 | A1 | 3/2018 | Kauhaniemi et al. | |
| 2018/0081398 | A1 | 3/2018 | Shin et al. | |
| 2019/0042066 | A1* | 2/2019 | Kim | G06F 3/04886 |
| 2020/0326754 | A1* | 10/2020 | Kim | G06F 1/1647 |
| 2020/0401017 | A1* | 12/2020 | Yamazaki | G03B 15/05 |
| 2021/0034210 | A1* | 2/2021 | Chung | G06F 3/0488 |
| 2021/0096611 | A1* | 4/2021 | Schenone | G06F 1/1647 |

* cited by examiner

[2109]

[2107]

[2105]

[2103]

[2101]

APPARATUS AND METHOD FOR PROVIDING ILLUMINATION OF CAMERA IN ELECTRONIC DEVICE

CROSS-REFERENCE TO RELATED APPLICATION(S)

This application is based on and claims priority under 35 U.S.C. § 119 to Korean Patent Application No. 10-2019-0123741, filed on Oct. 7, 2019, in the Korean Intellectual Property Office, the disclosure of which is incorporated by reference herein in its entirety.

BACKGROUND

1. Field

The disclosure relates generally to an electronic device capable of utilizing the display as illumination light for a camera that is being used to capture images such as still or moving images, and a control method thereof.

2. Description of Related Art

With recent advances in digital technology, various types of electronic devices such as mobile communication terminals, smartphones, tablet computers, laptop computers, or wearable devices are widely used.

Recently, electronic devices with gradually increasing screen sizes are being designed to provide various services to users through large screens. Electronic devices may have a new form factor such as a dual display device (e.g., a foldable device). A foldable device equipped with a foldable (or bendable) display (e.g., a flexible display) may be used in the folded state or in the unfolded state.

Electronic devices are being diversified in functionality, and may be implemented in the form of a multimedia player supporting composite functions such as taking photographs or videos, playing music or video files, playing games, and receiving broadcasts. Particularly, in an electronic device supporting selfie photographing, a camera and a display unit are disposed in the front part of the main body of the electronic device, so that the user can conveniently use the selfie photographing function. However, unlike the rear part of the main body of the electronic device, no flash is installed in the front part of the main body for safety reasons. Hence, when shooting using the front camera in a low-light environment, satisfaction with the shooting result may be degraded.

SUMMARY

The present disclosure has been made to address the above-mentioned problems and disadvantages, and to provide at least the advantages described below.

In accordance with an aspect of the disclosure, an electronic device is provided that includes a foldable display; a camera; a processor; and a memory operatively connected to the processor, wherein the memory may store instructions that cause, when executed, the processor to detect activation of the camera in an unfolded state of the foldable display with a specified angle; identify a first region and a second region in the foldable display in response to detecting camera activation; display a live view for the camera based on the first region; and output illumination light based on the second region.

In accordance with another aspect of the disclosure, an electronic device is provided that includes a foldable display; a camera; a processor; and a memory operatively connected to the processor, wherein the memory may store instructions that cause, when executed, the processor to: detect a user input for activating the camera; identify a state of the foldable display based on the user input; display a live view of an object obtained by the camera through a designated region of the foldable display based on a first state of the foldable display; divide the foldable display into a first region for a live view and a second region for a lighting plate with respect to a folding site based on a second state of the foldable display; display a live view of an object obtained by the camera based on the first region; and output illumination light based on the second region.

In accordance with another aspect of the disclosure, an operation method of an electronic device is provided that includes detecting activation of a camera in an unfolded state of the foldable display with a specified angle; identifying a first region and a second region in the foldable display in response to detecting camera activation; displaying a live view for the camera based on the first region; and outputting illumination light based on the second region.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Various embodiments of the disclosure provide an apparatus and method whereby an electronic device can take photographs by utilizing the display as illumination light of the camera.

Various embodiments of the disclosure provide an apparatus and method whereby, when an electronic device enters a shooting mode (or camera mode) using a camera, the display can be divided into a first region for displaying a user interface related to the camera and a second region for providing illumination, and the second region can be used to provide illumination light for the camera.

Various embodiments of the disclosure provide an apparatus and method whereby, when an electronic device having a foldable display initiates the shooting mode in the unfolded state with a specified range, the foldable display can be divided into a first region and a second region, where a live view of an image obtained through the camera can be displayed on the first region and illumination light for the camera can be provided through the second region.

In an electronic device and its operation method, according to various embodiments, when the lighting mode is activated, a lighting function may be provided to the camera through at least one region of the display. Thereby, the user can obtain an optimal shooting result by using the light of the display even in a low-illumination environment. In various embodiments, when the electronic device enters the shooting mode (or camera mode) using a camera, it may divide the display into a first region (e.g., a live view region) for displaying a user interface related to the camera and a second region (e.g., a lighting plate region) for providing illumination, and it may provide lighting optimized for photographing in the current situation through the second region.

The additional scope of applicability of the disclosure will become apparent from the detailed description below. As various changes and modifications within the spirit and scope of the disclosure can be clearly understood by those skilled in the art, it is to be understood that specific embodiments are given by way of example only.

Figure 1:
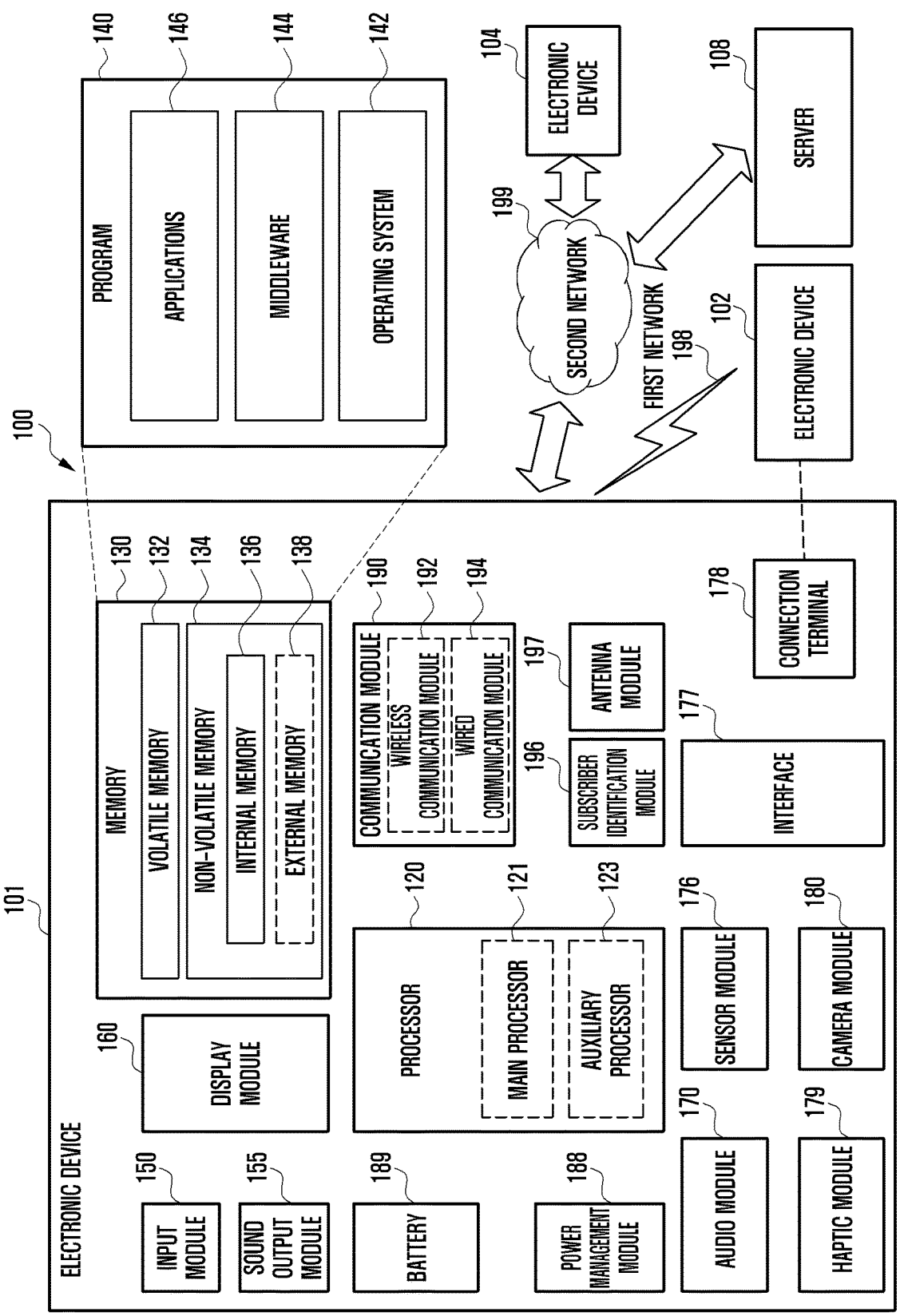
FIG. 1 illustrates an electronic device in a network environment, according to an embodiment.

FIG. 1 illustrates an electronic device 101 in a network environment 100 according to an embodiment.

Referring to FIG. 1, the electronic device 101 in the network environment 100 may communicate with an electronic device 102 via a first network 198 (e.g., a short-range wireless communication network), with an electronic device 104 or a server 108 via a second network 199 (e.g., a long-range wireless communication network), or with the electronic device 104 via the server 108, and may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) card 196, and an antenna module 197. At least one (e.g., the display device 160 or the camera module 180) of the components may be omitted from the electronic device 101, or one or more other components may be added in the electronic device 101. Some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. The processor 120 may load a command or data received from another component (e.g., the sensor module 176 or the communication module 190) in the volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101 and may include software (e.g., the program 140) and input data or output data for a command related thereto. The memory 130 may include the volatile memory 132 or the non-volatile memory 134.

The program 140 may be stored in the memory 130 as software, and may include an operating system (OS) 142, middleware 144, or an application 146.

The input device 150 may receive a command or data to be used by another component (e.g., the processor 120) of the electronic device 101, from the outside (e.g., a user) of the electronic device 101, and may include a microphone, a mouse, a keyboard, or a digital pen (e.g., a stylus pen).

The sound output device 155 may output sound signals to the outside of the electronic device 101 and may include a speaker or a receiver. The speaker may be used for general purposes, such as playing multimedia or playing record, and the receiver may be used for incoming calls and may be implemented as separate from, or as part of the speaker.

The display device 160 may visually provide information to the outside (e.g., a user) of the electronic device 101 and may include a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa, and may obtain the sound via the input device 150, or output the sound via the sound output device 155 or a headphone of an external electronic device (e.g., an electronic device 102) directly (e.g., over wires) or wirelessly coupled with the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state, and may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., over wires) or wirelessly, and may include a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102), and may include a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation, and may include a motor, a piezoelectric element, or an electric stimulator.

The camera module 180 may capture a still image or moving images and may include one or more lenses, image sensors, ISPs, or flashes.

The power management module 188 may manage power supplied to the electronic device 101, and may be implemented as at least part of a power management integrated circuit (PMIC).

The battery 189 may supply power to at least one component of the electronic device 101, and may include a primary cell which is not rechargeable, a secondary cell which is rechargeable, or a fuel cell.

The communication module 190 may support establishing a direct (e.g., wired) communication channel or a wireless communication channel between the electronic device 101 and the external electronic device the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., a LAN or a wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101 and may include an antenna including a radiating element composed of a conductive material or a conductive pattern formed in or on a substrate (e.g., a PCB). The antenna module 197 may include a plurality of antennas. In such a case, at least one antenna appropriate for a communication scheme used in the communication network, such as the first network 198 or the second network 199, may be selected by the communication module 190 (e.g., the wireless communication module 192) from the plurality of antennas. The signal or the power may then be transmitted or received between the communication module 190 and the external electronic device via the selected at least one antenna. Another component (e.g., an RFIC) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101.

All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing, as at least part of a reply to the request. To that end, a cloud, distributed, or client-server computing technology may be used, for example.

Figure 2:
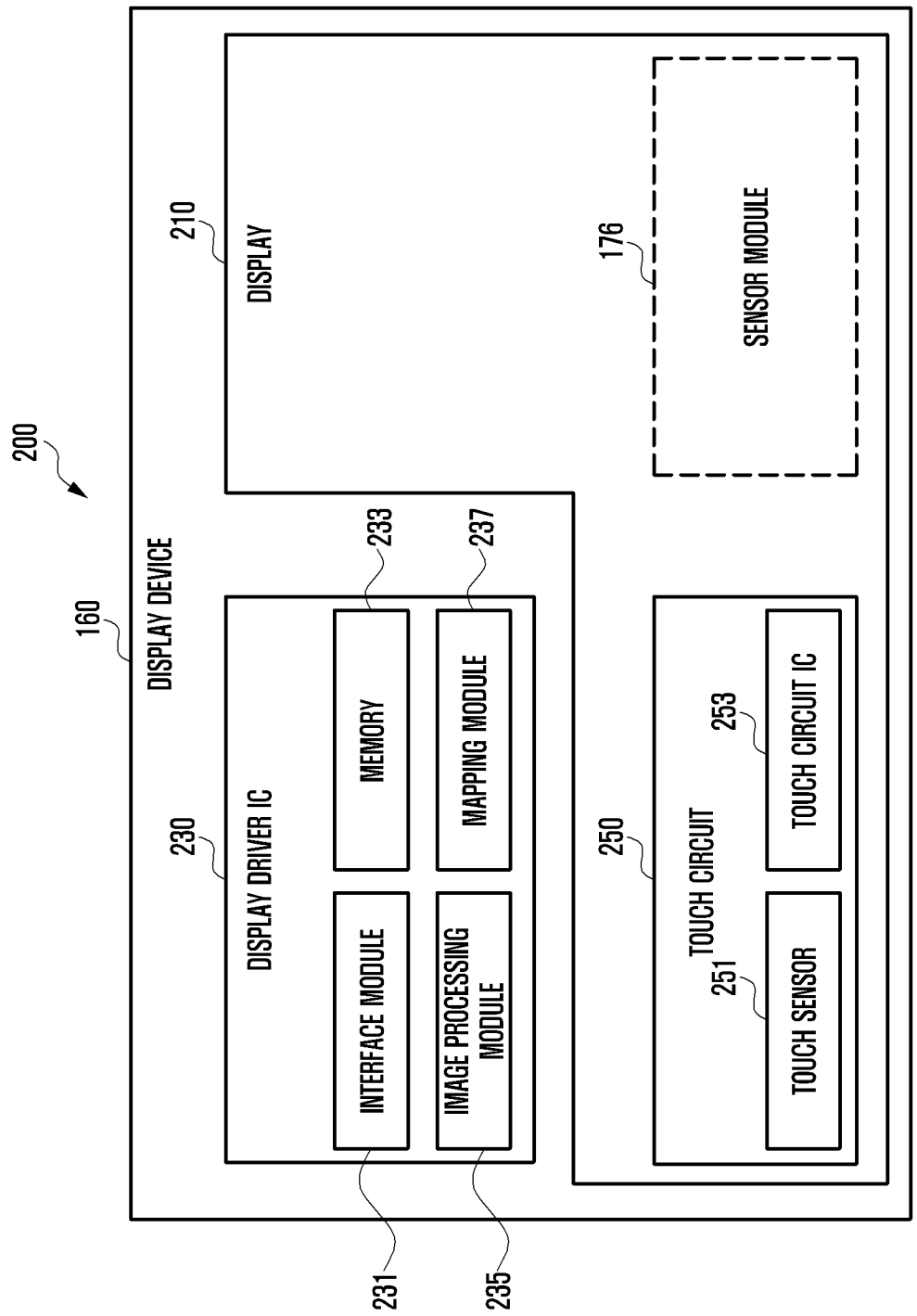
FIG. 2 is a block diagram illustrating the display device, according to various embodiments.

FIG. 2 is a block diagram 200 illustrating the display device 160 according to various embodiments.

Referring to FIG. 2, the display device 160 may include a display 210 and a display driver integrated circuit (DDI) 230 to control the display 210. The DDI 230 may include an interface module 231, memory 233 (e.g., buffer memory), an image processing module 235, or a mapping module 237.

The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an AP)) or the auxiliary processor 123 (e.g., a graphics processing unit) operated independently from the function of the main processor 121. The DDI 230 may communicate, for example, with touch circuitry 350 or the sensor module 176 via the interface module 231. The DDI 230 may also store at least part of the received image information in the memory 233, for example, on a frame by frame basis.

The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210.

The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment, the display device 160 may further include the touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display device 160.

According to an embodiment, the display device 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 250)) of the display device 160. For example, when the sensor module 176 embedded in the display device 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display device 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

The electronic device 101 according to embodiments may be one of various types of electronic devices, such as a portable communication device (e.g., a smartphone), a computer device, a portable multimedia device, a portable medical device, a camera, a wearable device, or a home appliance. However, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., over wires), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
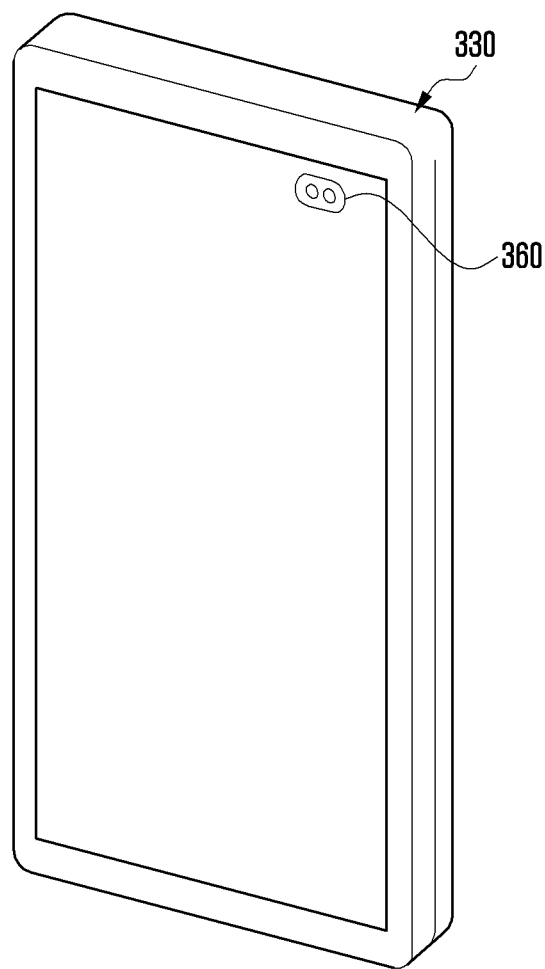
FIGS. 3, 4 and 5 illustrate configurations of an electronic device, according to various embodiments.
Figure 4:
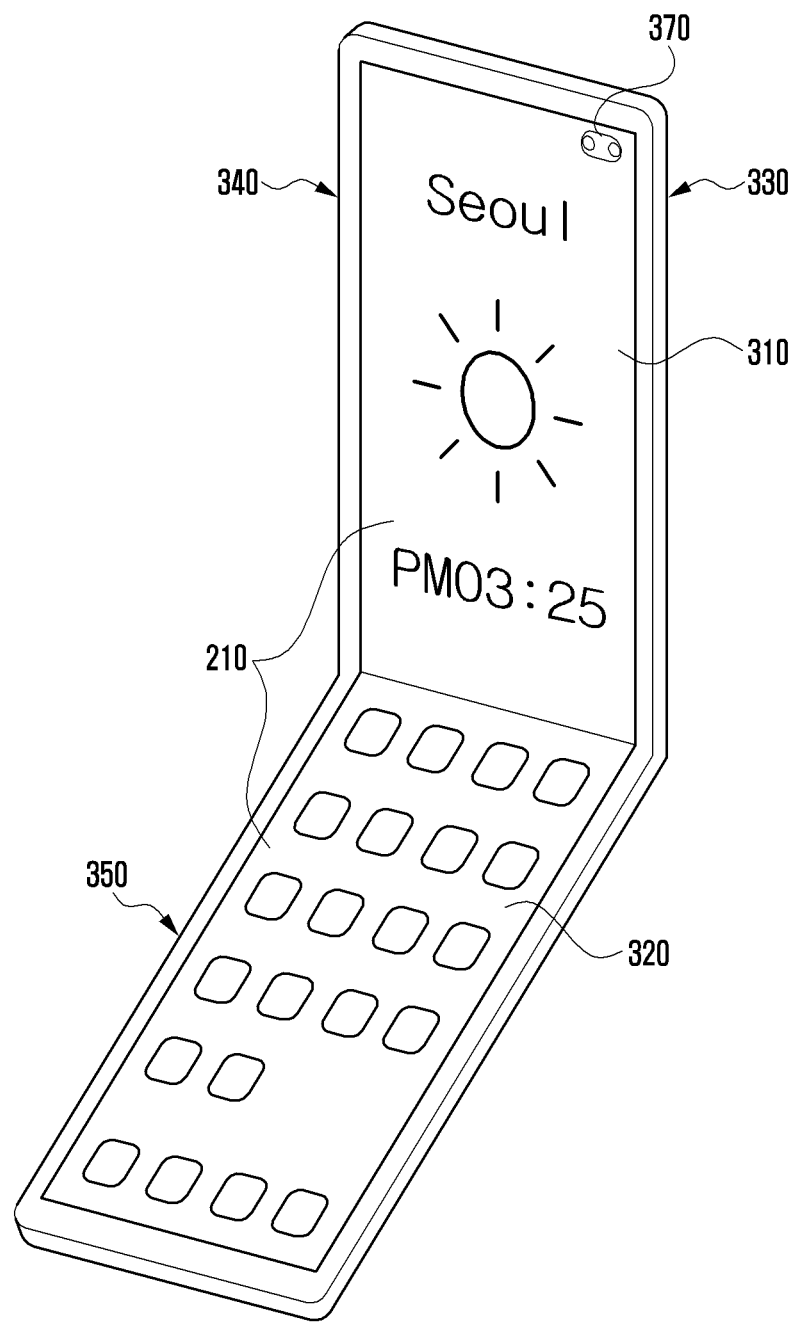
Figure 5:
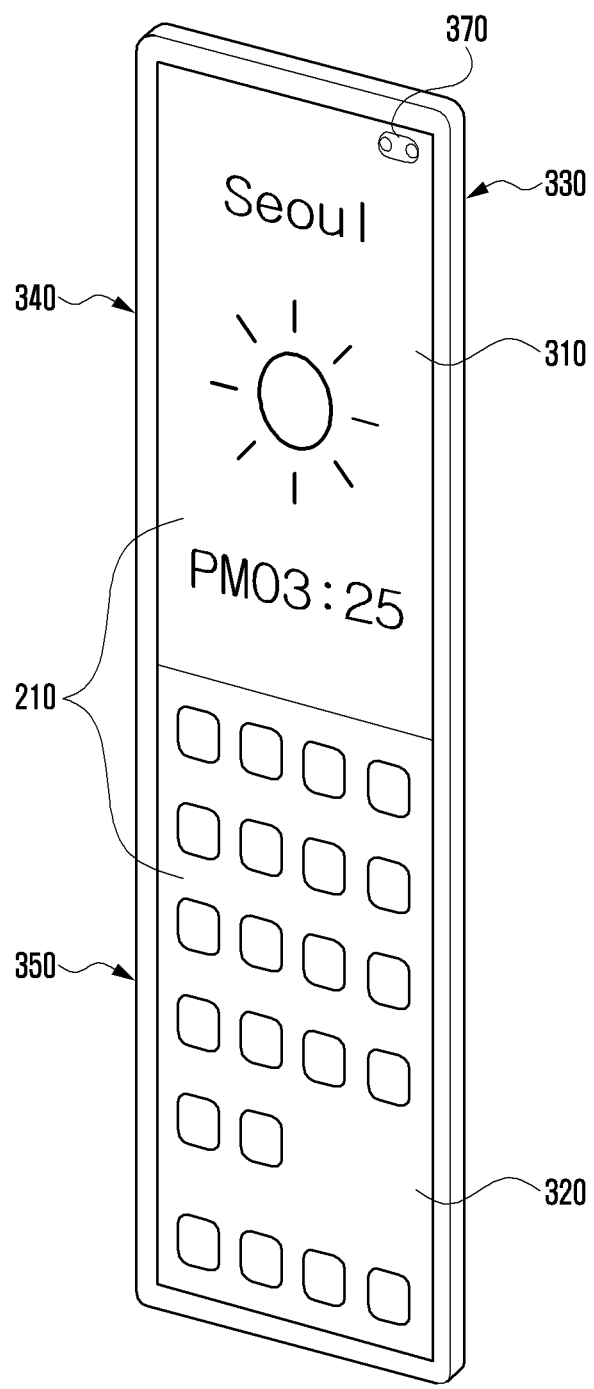

FIGS. 3, 4 and 5 illustrate configurations of the electronic device 101, according to various embodiments.

FIGS. 3, 4 and 5 illustrate an example of changing the shape of the display 210 in the electronic device 101 including a foldable (or bendable) display 210 (e.g., flexible display or a foldable display).

The electronic device 101 may be a foldable device that can be folded and unfolded. For example, when the electronic device 101 is folded into a folded state based on an in-folding mechanism, at least a portion of the first region 310 (or a first display surface) of the display 210 and at least a portion of the second region 320 (or a second display surface) thereof intersect with respect to the folding site (e.g., the folding axis) in a closed state, as shown in FIG. 3. When the electronic device 101 is unfolded (e.g., in an unfolded state), surfaces of the first region 310 and the second region 320 may be configured as one surface, providing a relatively large sized display, as shown in FIGS. 4 and 5. The electronic device 101 may be equipped with a foldable (or bendable) display (e.g., a flexible display or a foldable display) and may be used in the folded state or in the unfolded state.

FIG. 3 illustrates an example where the electronic device 101 is in the folded state (e.g., an in-folding state), FIG. 4 illustrates an example where the electronic device 101 is in the unfolded state with a preset angle, and FIG. 5 illustrates an example where the electronic device 101 is in the fully unfolded state. FIGS. 4 and 5 show examples where the display 210 is divided into the first region 310 (or a first display surface) and the second region 320 (or a second display surface).

The electronic device 101 illustrated in FIG. 3, 4 or 5 may include a DDI 230 operatively or electrically connected to the processor 120 and the display 210. For example, the first region 310 (or a first display surface) and the second region 320 (or a second display surface) may be connected to the DDI 230. Additionally or alternatively, the electronic device 101 may include a first DDI operatively or electrically connected to the first region 310 and a second DDI operatively or electrically connected to the second region 320. The first region 310 and the second region 320 may be operatively or electrically connected to each other, and may be implemented with a single display 210 (e.g., a flexible display or a foldable display).

In the electronic device 101, the display 210 may be folded or unfolded in various ways (e.g., in-folding or out-folding) according to implementation options.

With reference to FIGS. 3, 4 and 5, the electronic device 101 includes a housing 330 that fixes the display 210 including the first region 310 and the second region 320. The housing 330 may include a foldable structure (e.g., a hinge structure), and the first part 340 and the second part 350 may be configured to face away from each other in the folded state and may be configured to face in the same direction in the unfolded state.

The electronic device 101 may include a speaker (or receiver) and/or a camera such as a rear camera 360 or front camera 370 in the first part 340 of the housing 330. Other components (e.g., a physical home button, a function button (e.g., a volume control button), and at least one sensor (e.g., an illuminance sensor)) may be included in at least a portion of the first part 340 and/or the second part 350 depending on the implementation of the electronic device 101. The electronic device 101 may include, inside the housing 330, at least one sensor configured to detect the state of moving or gripping the electronic device 101, at least one processor operatively connected to the at least one sensor, and a memory that is operatively connected to the processor 120 and may be configured to store a first application (e.g., a camera application or a shooting application) providing a user interface (e.g., a live view or a preview) related to the camera operation, and a second application (e.g., a lighting application, a flash application, or a backlight application) related to the lighting operation utilizing the display 210.

The at least one sensor may include a sensor (e.g., a smart Hall sensor) to detect the operation state (e.g., a folded state or an unfolded state) of the electronic device 101 (or a display 210 thereof) and/or a sensor (e.g., an acceleration sensor or a gyro sensor) to detect the rotation and direction of the electronic device 101. The at least one sensor may include at least one of a touch sensor or a pressure sensor.

In various embodiments, the electronic device 101 may detect a change in configuration (e.g., folding and unfolding) of the display 210 in various ways.

At least one sensor may be disposed at one portion of the electronic device 101 (e.g., a folding axis or folding site, an end of the housing 330, a bottom of the display 210 (e.g., under the panel), or a bezel of the display 210) to measure the unfolding angle of the electronic device 101. Here, the unfolding angle may indicate the angle between the two display surfaces divided by the folding axis of the electronic device 101 with respect to the folding axis. The electronic device 101 may measure the unfolding angle to determine whether the electronic device 101 is fully folded or fully unfolded. For example, when the measured unfolding angle is about 180 degrees or an angle close thereto, the electronic device 101 may determine that the display 210 of the electronic device 101 is fully unfolded (e.g., in the unfolded state). Additionally or alternatively, when the measured unfolding angle is about 0 degrees or an angle close thereto, the electronic device 101 may determine that the display 210 of the electronic device 101 is fully folded (e.g., in the folded state). When the measured unfolding angle is within a preset angle range according to data obtained from at least one sensor, the electronic device 101 may determine that the display 210 of the electronic device 101 is folded or unfolded to a preset extent.

At least one sensor may be disposed at the bottom of the display 210 to identify the state or pattern in which the electronic device 101 is gripped by the user. For example, the electronic device 101 may identify the state in which the electronic device 101 is gripped by the user by using at least one of a touch sensor 251 or a pressure sensor. The touch sensor 251 and/or the pressure sensor may be included in the display 310 in the form of a single body. In this case, at least one of the touch sensor or the pressure sensor included in the display 210 may be considered to be located inside the housing 330 of the electronic device 101. The electronic device 101 may identify the state (or pattern) which the electronic device 101 is gripped by the user based on at least one of the touch sensor or the pressure sensor, determine whether the electronic device 101 is in the folded state or in the unfolded state based at least partially on the grip state, and separate the first region 310 and the second region 320 in the unfolded state. For example, the electronic device 101 may determine the grip mode (e.g., a left-handed mode, a right-handed mode, or a two-handed mode) based on at least one of the touch point, the touch area, and/or the number of touch points when the user touches at least one region (or a display surface) with fingers (and/or a palm of a hand), and separate the first region 310 and the second region 320 according to the grip mode. As shown in FIGS. 3, 4 and 5, the electronic device 101 may be changed from the folded state (e.g., an in-folding state of the display 210) to the unfolded state (e.g., an unfolded state of the display 210) or from the unfolded state to the folded state.

The electronic device 101 may store one or more application programs (e.g., a first application and a second application) in the memory 130 of the electronic device 101, and may independently display user interfaces related to the applications (e.g., a first user interface related to the first application and a second user interface related to the second application different from the first application) on the first region 310 (or a first display surface and the second region 320 (or a second display surface). The electronic device 101 may display a first user interface of the first application based on the first region 310 and display a second user interface of the second application based on the second region 320.

The electronic device 101 may display a first user interface and/or a second user interface according to the display state (e.g., a folded state or an unfolded state) via which the display 210 is changed. The operation states may include a first state in which a transition is made from the folded state to the unfolded state, a second state in which a transition is made from the unfolded state to the folded state, a third state in between the first state and the second state (e.g., an unfolded state in which the first region 310 and the second region 320 have a specific angle with respect to the folding site (or reference site)), and/or a fourth state in which the electronic device 101 is rotated in the unfolded state (e.g., rotating the electronic device 101 in the left or right direction while the user is looking at the display 210).

The electronic device 101 may provide a first user interface or a second user interface based on a certain region (or some display surface), or may provide the first user interface or the second user interface based on both the first region 310 and the second region 320 (e.g., a whole display surface) according to a change in the shape (or state) of the display 210 such as folding or unfolding of the display 210.

Based on a state change from the folded state to the unfolded state (e.g., a first state change), the electronic device 101 may display a first user interface and a second user interface respectively on the first region 310 and the second region 320 of the display 210. Based on a state change from the unfolded state or folded state to the unfolded state with a certain angle relative to the folding site (e.g., a second state change), the electronic device 101 may operate so as to provide an identified region (e.g., a second region 320) for illumination of the camera.

When the electronic device 101 is fully folded (e.g., in the folded state) as shown in FIG. 3, this may indicate that the first region 310 and the second region 320 included in the display 210 of the electronic device 101 face each other and the first region 310 and the second region 320 are substantially parallel. For example, the fact that the electronic device 101 is fully folded may indicate that the first region 310 and the second region 320 of the electronic device 101 do not necessarily contact each other but are disposed in very close proximity. When the electronic device 101 is fully unfolded (e.g., in the unfolded state) as shown in FIG. 5, this may indicate that the first region 310 of the first part 340 in the electronic device 101 and the second region 320 of the second part 350 are exposed to the outside in the form of a flat surface like a single display, so that the area of the display 210 exposed to the outside is substantially the largest.

Figure 6:
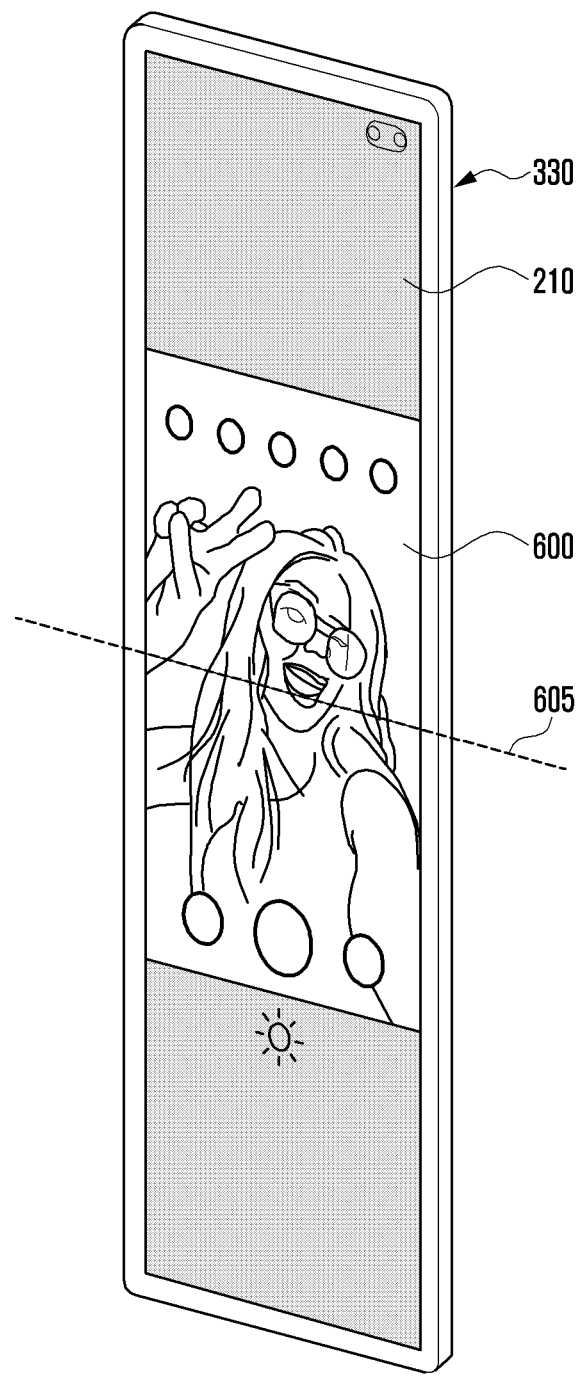
FIGS. 6 and 7 show examples of operating the display based on the state of the electronic device in a shooting mode, according to various embodiments.
Figure 7:
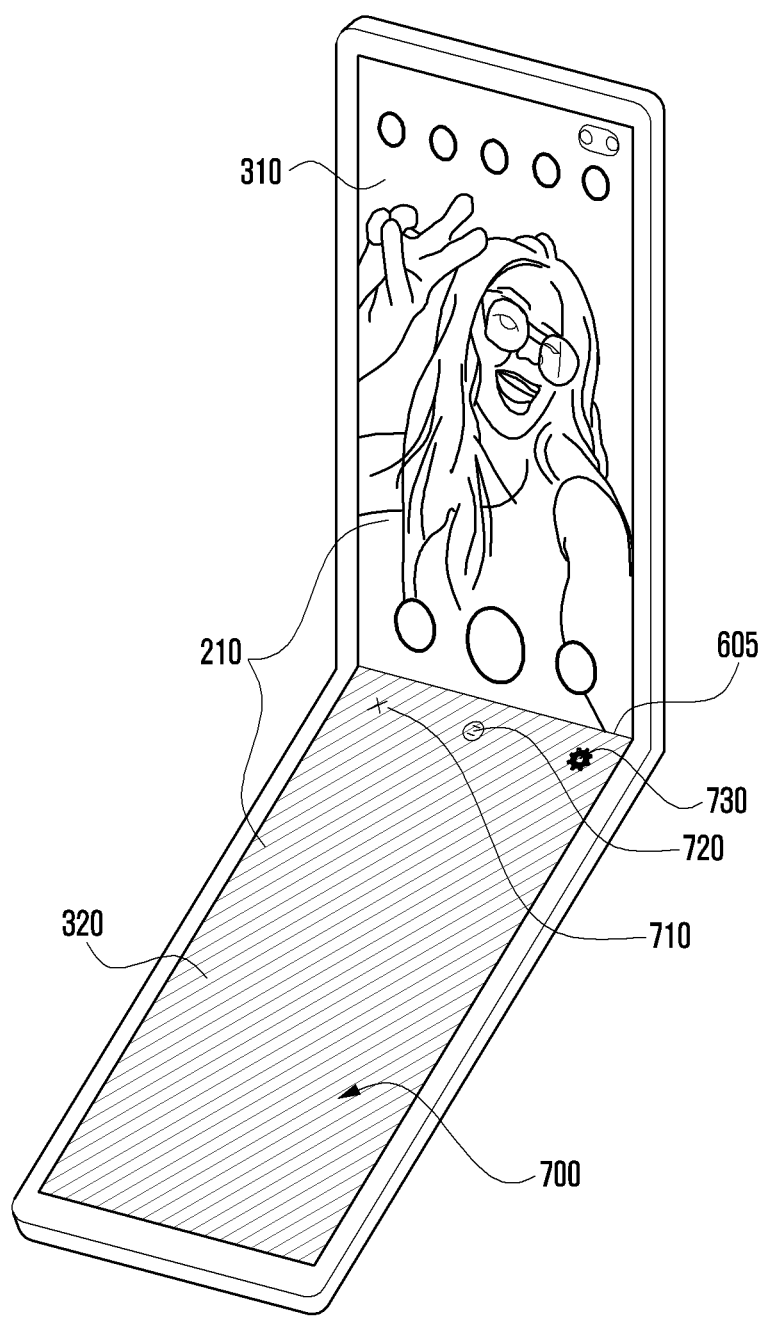

FIGS. 6 and 7 show examples of operating the display based on the state of the electronic device 101 in a shooting mode, according to various embodiments.

With reference to FIGS. 6 and 7, the electronic device 101 includes one vertical folding axis (or a folding site) 605 (or hinge axis). Additionally or alternatively, the electronic device 101 may include a plurality of folding axes. For example, the electronic device 101 may include at least two folding axes, and each of the at least two folding axes may be implemented in a form in which the display 210 of the electronic device 101 is divided into multiple sections (e.g., three equal parts or four equal parts).

Referring to FIGS. 6 and 7, the electronic device 101 includes a vertical folding axis 605 (or a hinge axis) (referred to as a "folding axis") passing through the center of the electronic device 101 (e.g., center of the display 210, or between the first region 310 and the second region 320). The electronic device 101 may be folded (or bent) or unfolded with respect to the folding axis 605. The electronic device 101 may be folded inward so that the display 210 (e.g., the first region 310 and the second region 320) is not exposed to the outside of the electronic device 101 (e.g., an in-folding type). Additionally or alternatively, the electronic device 101 may be folded outward so that the display 210 (e.g., the first region 310 and the second region 320) is exposed to the outside of the electronic device 101 (e.g., an out-folding type).

The vertical folding axis 605 is shown as passing through the center of the electronic device 101, but the vertical folding axis 605 may be present at any portion of the electronic device 101. For example, the electronic device 101 may be asymmetrically folded or bent with respect to the vertical folding axis 605, and the sizes of the two regions (or two display surfaces) divided by the vertical folding axis 605 (or the sizes of the first region 310 and the second region 320, after being folded) when the electronic device 101 is folded may be different. The electronic device 101 may be in an intermediate form (e.g., FIGS. 4 and/or 7) between a fully folded form and a fully unfolded form depending on the degree of folding of the electronic device 101.

The electronic device 101 may identify the folding state of the display 210 (e.g., the fully folded state, the fully unfolded state, or the intermediate state therebetween (e.g., the degree of bending)). The electronic device 101 may identify the folding state thereof and may activate or deactivate at least a region (e.g., the first region 310 or the second region 320) of the display 210 included in the electronic device 101. The electronic device 101 may identify the folding state of the display 210 to deactivate the display 210.

The embodiment illustrated in FIG. 6 may represent an example of a screen when the electronic device 101 in the unfolded state operates in the shooting mode. When entering the shooting mode in the unfolded state, the electronic device 101 may display a live view (or a preview) of an image (or an object) (e.g., a still or moving images) captured by the camera on a designated region (e.g., a designated region for a live view) of the display 210.

The embodiment illustrated in FIG. 7 may indicate a situation where the electronic device 101 is in an intermediate state between the folded state and the unfolded state while operating as shown in FIG. 6. As shown in FIG. 7, when the shooting mode is activated in a state unfolded with a specified range, the electronic device 101 may divide the display 210 into the first region 310 and the second region 320. The electronic device 101 may display a live view 600 of an image (e.g., a still or a moving image) obtained through the camera on the first region 310 and provide illumination light to the camera through the second region 320. For example, the electronic device 101 may operate the second region 320 as a lighting plate 700 for illumination of the camera. To operate the second region 320 as a lighting plate 700, the electronic device 101 may provide illumination light (or emit light) through the second region 320. The electronic device 101 may include a light emitter (or a backlight) disposed on the rear surface of the display 210 and emit light in the front direction of the main body, and may output illumination light through the designated second region 320 by locally adjusting the amount of light emitted by the light emitter. Additionally or alternatively, to adjust the brightness of the second region 320 of the display 210 (e.g., to provide lighting), the electronic device 101 may display an object (e.g., an image) of a preset color on the second region 320. The preset color may include a white-based bright color, and may adjust the brightness of the second region 320 (or provide lighting) by using the object.

When operating the second region 320 as a lighting plate 700, the electronic device 101 may display a user interface (e.g., a graphical user interface (GUI)) related to lighting function control on at least a portion of the second region 320 (e.g., an upper portion of the second region 320). The user interface may include a first object 710 (e.g., a lighting plate close button), a second object 720 (e.g., a lighting plate size adjustment button), and/or a third object 730 (e.g., a lighting plate setting button). The electronic device 101 may adjust the transparency of the object displayed on the second region 320 so that light generated by the light emitter is projected (output).

As described above with reference to FIGS. 3 to 7, the electronic device 101 may include a display 210 in the form of a foldable (or flexible) display that can be folded or unfolded. Although a horizontal axis foldable display is described as an example, various embodiments are not limited thereto and may also be applied in the form of a vertical axis foldable display, and the shape of the display 210 that the electronic device 101 may have may be varied. The electronic device 101 may be folded or unfolded with respect to one or more folding axes.

As described above with reference to FIGS. 6 and 7, when executing the shooting mode (or, running the camera) or when the display 210 is folded at a preset angle, the electronic device 101 may divide the display 210 into a first region 310 and a second region 320 based on the folding site where the display 210 is folded. The electronic device 101 may provide (display) a user interface related to the camera (e.g., a reconfigured camera user interface) through the first region 310, and provide (output or emit) illumination light optimized for the current situation (e.g., a surrounding environment) through the second region 320 by operating the second region 320 as a lighting plate 700.

According to an embodiments, an electronic device may include a foldable display; a camera; a processor; and a memory operatively connected to the processor, wherein the memory may store instructions that cause, when executed, the processor to detect activation of the camera in an unfolded state of the foldable display with a specified angle; identify a first region and a second region in the foldable display in response to detecting camera activation; display a live view for the camera based on the first region; and output illumination light based on the second region.

The instructions may be configured to cause the processor to detect a transition of the foldable display to the unfolded state with an angle less than the specified angle in a shooting mode; and divide the foldable display into the first region and the second region in response to detection of the transition to the unfolded state.

The foldable display may include at least one folding axis, and may be divided into at least two regions based on the at least one folding axis.

The instructions may be configured to cause the processor to identify the first region and the second region based on the at least one folding axis.

The instructions may be configured to cause the processor to identify the state of the foldable display in response to a user input activating the camera; display a live view of an object obtained by the camera through a designated region of the foldable display based on a first state of the foldable display; and divide the foldable display into a first region for a live view and a second region for a lighting plate with respect to a folding site based on a second state of the foldable display.

The instructions may be configured to cause the processor to provide a transition animation when dividing the foldable display into the first region and the second region.

The instructions may be configured to cause the processor to move the live view in a slide manner to the first region and display it thereon; and provide a user interface related to the lighting plate in a fade-in manner on the second region.

The instructions may be configured to cause the processor to create a lighting plate using at least two regions based on at least two folding sites.

The instructions may be configured to cause the processor to provide different illumination light for the at least two regions.

The instructions may be configured to cause the processor to provide a photographing function in response to a user input on the second region.

The instructions may be configured to cause the processor to provide a virtual boundary identical to the boundary of a photographed result based on the rotation of the electronic device regardless of a rotation direction of the electronic device.

The instructions may be configured to cause the processor to divide the foldable display into a first region and a second region when the electronic device in an unfolded state with an angle less than the specified angle enters the shooting mode; display a live view of an image obtained through the camera on the first region; and set the second region as a lighting plate for illumination of the camera.

The instructions may be configured to cause the processor to provide a user interface for operating the lighting plate on the second region.

The instructions may be configured to cause the processor to provide a user interface for operating the lighting plate on the lighting plate while outputting illumination light through the second region.

The instructions may be configured to cause the processor to detect a user input for a specified object in the unfolded state of the electronic device with a specified angle; and divide the foldable display into the first region and the second region in response to the user input.

According to an embodiment, an electronic device may include a foldable display; a camera; a processor; and a memory operatively connected to the processor, wherein the memory may store instructions that cause, when executed, the processor to detect a user input for activating the camera; identify the state of the foldable display based on the user input; display a live view of an object obtained by the camera through a designated region of the foldable display based on a first state of the foldable display; divide the foldable display into a first region for a live view and a second region for a lighting plate with respect to the folding site based on a second state of the foldable display; display a live view of an object obtained by the camera based on the first region; and output illumination light based on the second region.

The first state may include an unfolded state with a specified angle or a fully unfolded state, and the second state may include an unfolded state with an angle less than the specified angle.

A detailed description will subsequently be given that describes an operation method of the electronic device 101. Operations of the electronic device 101 described below may be executed by at least one processor 120 (e.g., including a processing circuit) of the electronic device 101. The operations of the electronic device 101 may be implemented with instructions that are stored in the memory 130 and cause the processor 120 to perform the operations.

Figure 8:
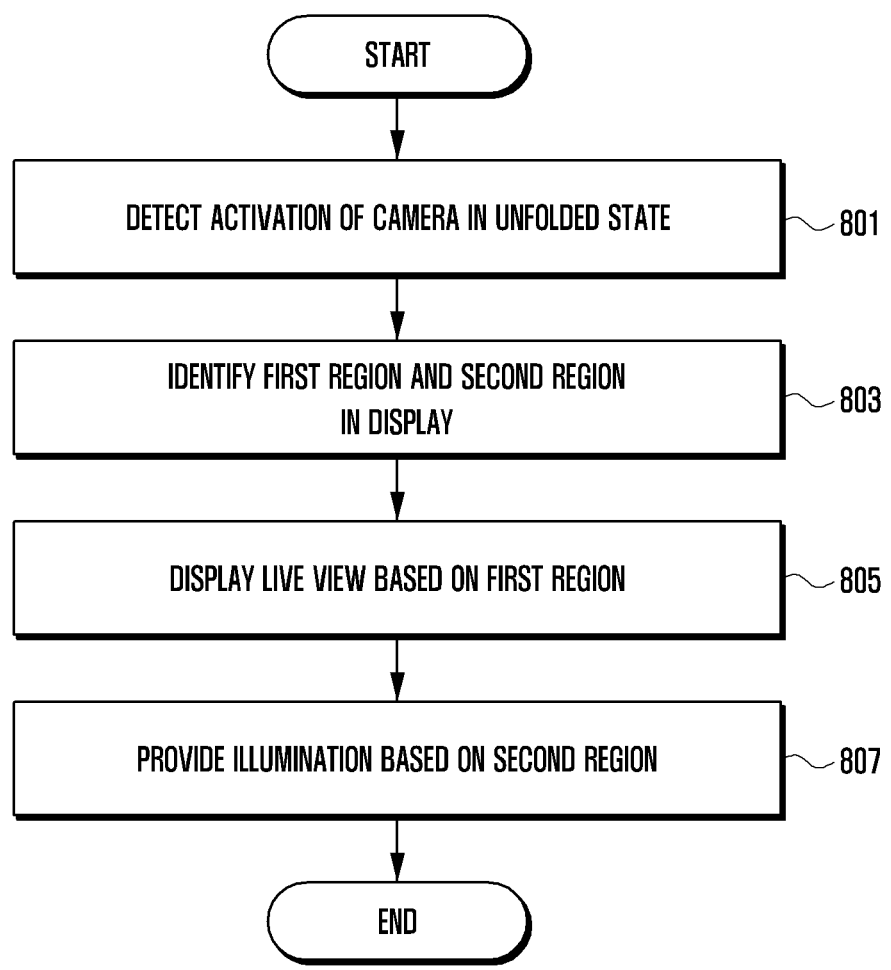
FIG. 8 is a flowchart illustrating an operation method of the electronic device, according to an embodiment.

FIG. 8 is a flowchart illustrating an operation method of the electronic device 101, according to an embodiment.

With reference to FIG. 8, at step 801, the processor 120 of the electronic device 101 in the unfolded state detects the activation of the camera. For example, in a state where the electronic device 101 is unfolded at an angle less than a specified angle (e.g., 180 degrees or an angle close thereto), as shown in FIG. 4, the processor 120 may detect a user input for entering the shooting mode (or a camera mode) through activation of the camera 370. The processor 120 may perform operations in response to a trigger in which the electronic device 101 is transitioned to the unfolded state with an angle less than the specified angle in the shooting mode (e.g., a transition from the unfolded state with the specified angle to a folded state with a preset angle), or a trigger in which an object for entering the lighting mode is selected when the electronic device 101 is unfolded at the specified angle.

At step 803, the processor 120 identifies a first region and a second region in the display 210. The processor 120 may divide the display 210 into a first region and a second region with respect to the folding site (e.g., a folding axis) in parallel or in sequence with the operation of entering the shooting mode according to a user input. The first region may include a region for providing a user interface related to the camera operation (e.g., a live view or a preview), and the second region may include a region operating as a lighting plate for illumination of the camera.

At step 805, the processor 120 displays a live view based on the first region of the display 210. For example, as shown in FIG. 7, the processor 120 may divide the display 210 into a first region 310 and a second region 320, and display a live view (or a preview) of an image (or an object) obtained by the camera on the first region 310.

At step 807, the processor 120 provides (or outputs) illumination light based on the second region of the display 210. The processor 120 may provide illumination light to the camera through the second region 320. For example, the processor 120 may operate the second region 320 as a lighting plate for illumination of the camera. When the second region 320 is operated as a lighting plate, the processor 120 may provide illumination light (or emit light) through the second region 320. The electronic device 101 may include a light emitter (or a backlight) disposed on the rear surface of the display 210 and emit light in the front direction of the main body, and the processor 120 may output illumination light through the second region 320 by locally adjusting the amount of light emitted by the light emitter. To adjust the brightness of the second region 320 of the display 210 (e.g., provide lighting), the processor 120 may display an object (e.g., an image) of a preset color on the second region 320. For example, the preset color may include a white-based bright color.

Figure 9:
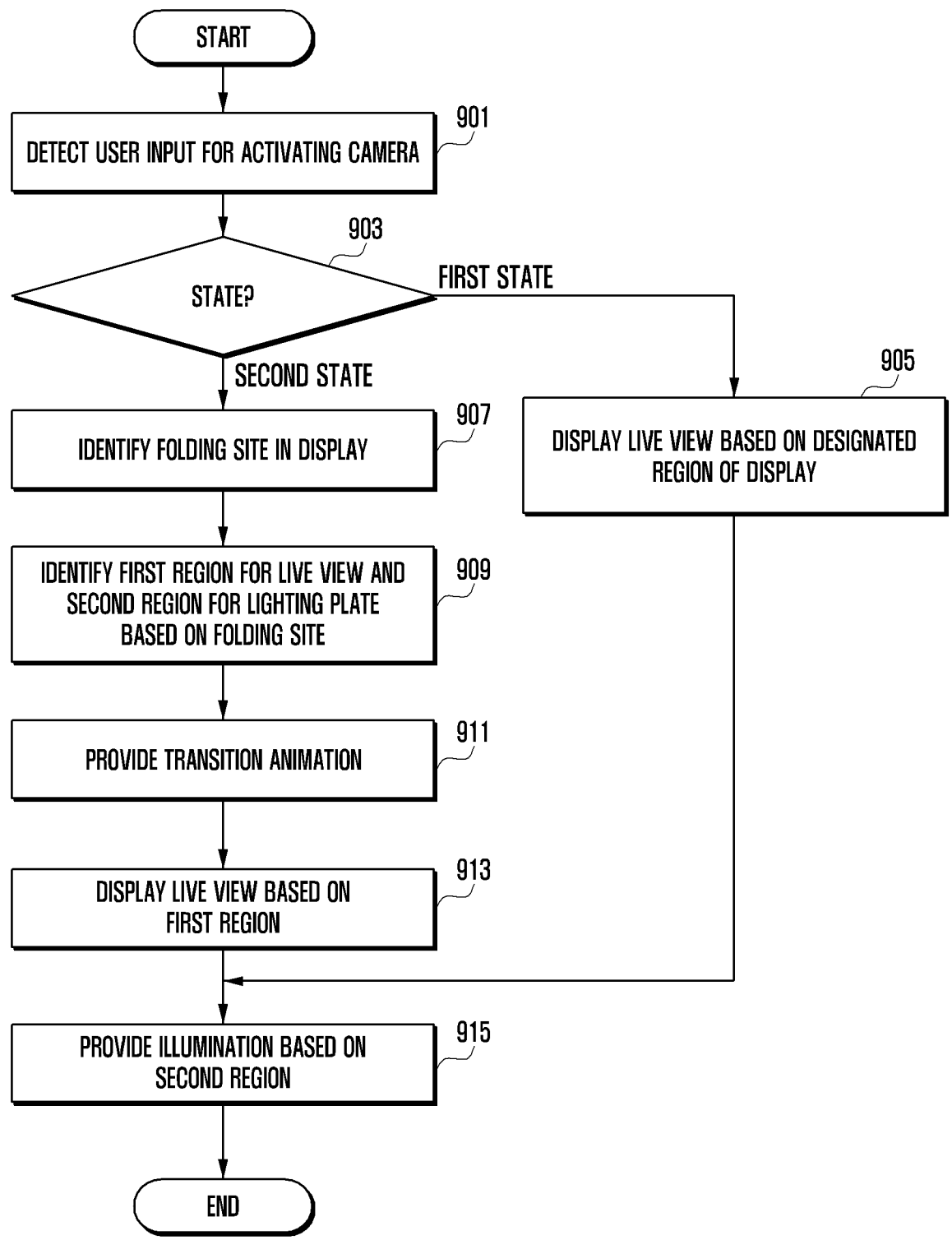
FIG. 9 is a flowchart illustrating an operation method of the electronic device, according to an embodiment.

FIG. 9 is a flowchart illustrating an operation method of the electronic device 101, according to an embodiment.

With reference to FIG. 9, at step 901, the processor 120 of the electronic device 101 detects a user input for activating the camera. The processor 120 may detect a user input for entering the shooting mode through activation of the camera.

At step 903, when the camera is activated (or when entering the shooting mode), the processor 120 identifies the state (e.g., a first state or a second state) of the electronic device 101. The first state of the electronic device 101 may include a state (e.g., a fully unfolded state) in which the electronic device 101 is fully unfolded at a specified angle (e.g., 180 degrees or an angle close thereto). The second state of the electronic device 101 may include a state in which the electronic device 101 is unfolded with a preset angle less than the specified angle. The processor 120 may obtain state information (e.g., sensor information) of the electronic device 101 from at least one sensor, and may identify the folding state of the electronic device 101 based on the state information.

Upon identifying that the electronic device 101 is in the first state based on the state identification at step 903, at step 905, the processor 120 displays a live view based on a designated region of the display 210 (e.g., a center of the screen of the display 210 or a designated location). For example, as shown in FIG. 6, the processor 120 may display a live view in a full screen format (or a full view) or at a designated location of the display 210. To provide a live view in a full screen format, the processor 120 may output the live view on the full screen of the display 210.

Upon identifying that the electronic device 101 is in the second state based on the state identification at step 903, at step 907, the processor 120 identifies the folding site. The folding site (or a folding axis) may indicate a reference axis (or reference line) where the display 210 is folded (or bent) to have a preset unfolding angle between the first region 310 and the second region 320. The unfolding angle may indicate an angle between the first region 310 and the second region 320 divided by the folding site (or a folding axis) of the electronic device 101 with respect to the folding site.

At step 909, the processor 120 identifies a first region for a live view and a second region for a lighting plate based on the folding site. As shown in FIGS. 6 and/or 7, when the electronic device 101 is in an unfolded state with a specified range and the shooting mode is activated, the processor 120 may divide the display 210 into a first region 310 and a second region 320 based on the designated folding site. The processor 120 may set the first region 310 as a region for a live view of an image obtained through the camera, and may operate the second region 320 as a lighting plate 700 for illumination of the camera.

At step 911, the processor 120 provides a transition animation. The processor 120 may provide a transition animation effect by displaying a live view with movement (or sliding) on the first region 310 in a slide manner and gradually output illumination light through the second region 320 in a fade-in manner (e.g., by brightening the screen). The transition animation effect can be provided in various other ways. For example, the processor 120 may divide the display 210 into the first region 310 and the second region 320 and immediately perform operations corresponding respectively to the first region 310 and the second region 320 without providing a transition animation effect.

At step 913, the processor 120 displays a live view based on the first region of the display 210. The processor 120 may display a live view (or a preview) of an image (or an object) captured by the camera on the first region 310.

At step 915, the processor 120 provides (outputs) illumination light based on the second region of the display 210. The processor 120 may output illumination light for the camera through the second region 320. The processor 120 may operate the second area 320 as a lighting plate for illumination of the camera. When the second region 320 is operated as a lighting plate, the processor 120 may provide illumination light (or emit light) through the second region 320. Based on a light emitter (or a backlight), the processor 120 may output illumination light through the second region 320 by locally adjusting the amount of light emitted by the light emitter.

Figure 10:
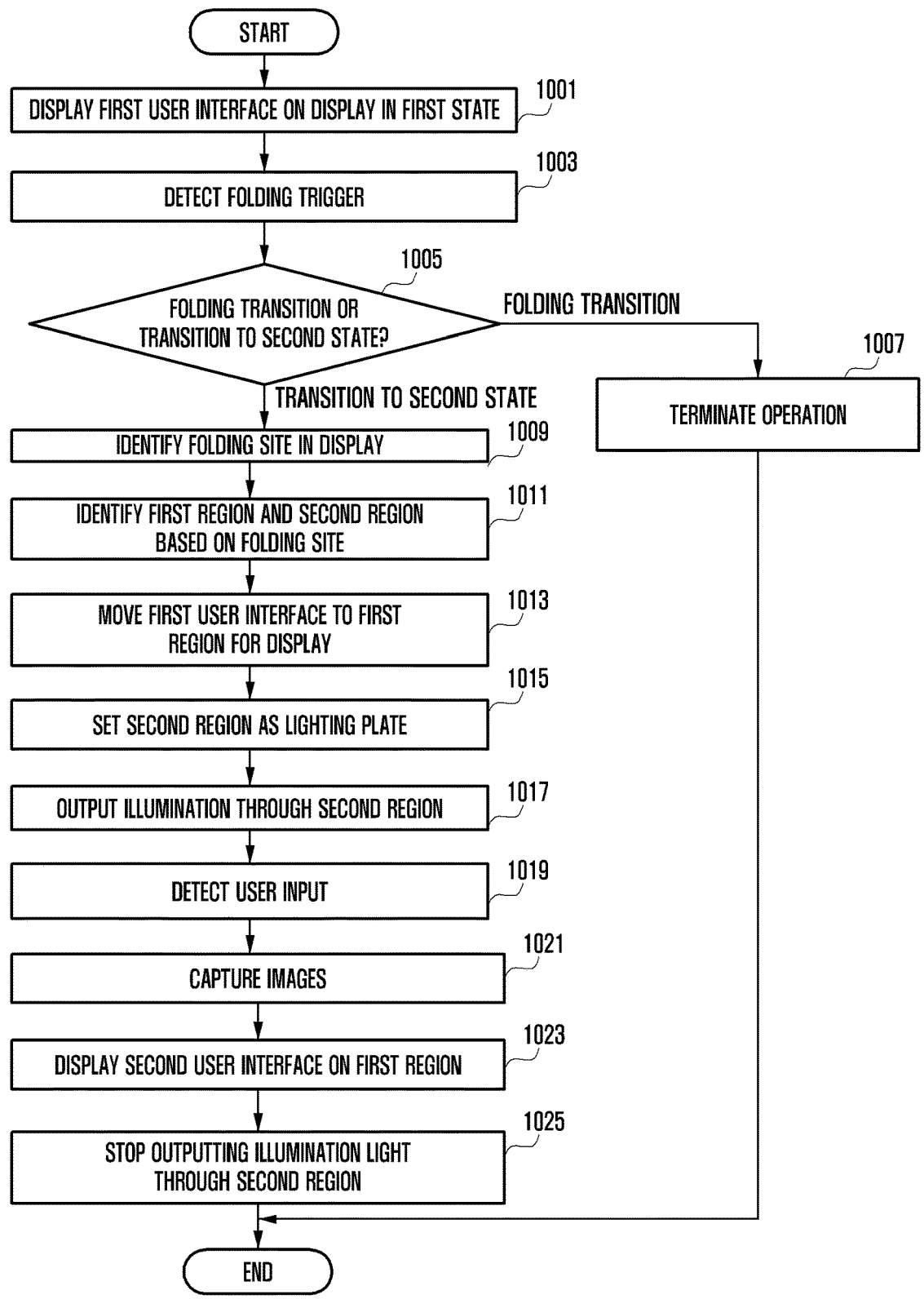
FIG. 10 is a flowchart illustrating an operation method of the electronic device, according to an embodiment.

FIG. 10 is a flowchart illustrating an operation method of the electronic device 101, according to an embodiment.

With reference to FIG. 10, at step 1001, the processor 120 of the electronic device 101 displays a first user interface on the display 210 in a first state of the electronic device 101. The first state of the electronic device 101 may include a state (e.g., a fully unfolded state) in which the electronic device 101 is fully unfolded at a specified angle (e.g., 180 degrees or an angle close thereto). As shown in FIG. 5, the processor 120 may detect a user input for camera activation in the unfolded state with a specified angle (e.g., a fully unfolded state). For example, the user may select touch) an icon related to camera activation on the home screen output on the display 210, or may operate the electronic device 101 to recognize a designated motion (or a gesture) related to camera activation. The processor 120 may display a live view of an image obtained through the camera without dividing the display 210 into regions, as shown in FIG. 6, in response to a user input related to camera activation.

At step 1003, the processor 120 detects a folding trigger. The folding trigger may include, for example, a trigger in which the electronic device 101 is folded from the first state to the second state (or a transition to the second state), or a trigger in which the electronic device 101 is folded from the first state to the fully folded state (e.g., a folding transition). The second state of the electronic device 101 may include a state in which the electronic device 101 is unfolded with a preset angle less than the specified angle.

Upon detecting a folding trigger, at step 1005, the processor 120 determines whether the folding trigger corresponds to a folding transition or a transition to a second state. The processor 120 may obtain state information (e.g., sensor information) of the electronic device 101 from at least one sensor, and may identify the state of the electronic device 101 based on the state information.

Upon determining that the folding trigger corresponds to a folding transition at step 1005 (e.g., the "folding transition" branch at step 1005), at step 1007, the processor 120 terminates at least some operations of the electronic device 101. For example, the processor 120 may deactivate (or turn off) the display 120 of the electronic device 101 and cause the electronic device 101 to operate in a power saving mode (or a low power mode).

Upon determining that the folding trigger corresponds to a transition to a second state at step 1005 (e.g., the "transition to second state" branch at step 1005), at step 1009, the processor 120 identifies the folding site. The folding site (or folding axis) may indicate a reference axis (or reference line) where the display 210 is folded (or bent) to have a preset unfolding angle between the first region 310 and the second region 320. For example, the unfolding angle may indicate an angle between the first region 310 and the second region 320 divided by the folding site (or a folding axis) of the electronic device 101 with respect to the folding site.

At step 1011, the processor 120 identifies a first region for a live view and a second region for a lighting plate based on the folding site. As shown in FIGS. 6 and 7, when the electronic device 101 is in an unfolded state with a specified range and the shooting mode is activated, the processor 120 may divide the display 210 into a first region 310 and a second region 320 with respect to the designated folding site.

At step 1013, the processor 120 moves a first user interface to the first region and displays it thereon. For example, the processor 120 may display a live view of an image obtained through the camera based on the first region of the display 210. The processor 120 may selectively provide a transition animation. The processor 120 may provide a transition animation effect by displaying a live view with movement (or sliding) on the first region 310 in a slide manner and gradually output illumination light through the second region 320 in a fade-in manner (e.g., brightening the screen).

At step 1015, the processor 120 sets the second region as a lighting plate. The processor 120 may set the first region 310 as a region for a live view of an image obtained through the camera, and may operate the second region 320 as a lighting plate 700 for illumination of the camera.

At step 1017, the processor 120 provides (outputs) illumination light based on the second region of the display 210. The processor 120 may provide illumination light to the camera through the second region 320. For example, the processor 120 may operate the second region 320 as a lighting plate for illumination of the camera. When the second region 320 is operated as a lighting plate, the processor 120 may provide illumination light (or emit light) through the second region 320. Based on a light emitter (or a backlight), the processor 120 may output illumination light through the second region 320 by locally adjusting the amount of light emitted by the light emitter. When outputting illumination light based on the second region, as shown in FIG. 7, the processor 120 may provide a control object including a first object 710 (e.g., a lighting plate close button), a second object 720 (e.g., a lighting plate size adjustment button), and/or a third object 730 (e.g., a lighting plate setting button) through the second region. The processor 120 may adjust the transparency of the object displayed on the second region 320 so that light generated by the light emitter is projected (output).

At step 1019, the processor 120 detects a user input. The user input may include, for example, a first user input for shooting or a second user input for controlling settings (e.g., a brightness and/or color temperature related to lighting, and size (or area) of a lighting plate) of the second region (e.g., a lighting plate). In FIG. 10, operations for the first user input are described. The first user input may include an input through a user interface related to the camera (e.g., a shooting button) on the first region, an input designated for shooting on the second region, or an input by user motion recognition using the camera.

At step 1021, the processor 120 takes photographs in response to the user input (e.g., a first user input). The processor 120 may capture an image of an object displayed as a live view on the first region.

At step 1023, the processor 120 displays a second user interface on the first region. The first user interface may include a live view, and the second user interface may include an image being a shooting result.

At step 1025, the processor 120 stops outputting illumination light through the second region. When providing an image as a result of photographing, the processor 120 may turn off a corresponding portion of the second region of the display 210 to stop illumination (or stop a lighting mode) through the second region. Turning off the second region may include, for example, turning off the light emitter (or a backlight). When turning off the second region, the processor 120 may maintain a specific portion of the second region (e.g., an always-on display (AOD)) to continuously display at least one designated object (e.g., a lighting mode activation button, or a lighting plate generation button). Although an example of switching an operation after photographing is provided, such as step 1023 and step 1025 in FIG. 10, the disclosure is not limited thereto. Additionally or alternatively, the shooting result may be saved during shooting and the live view display and illumination may be maintained for continuous shooting depending on options of the shooting mode.

Figure 11:
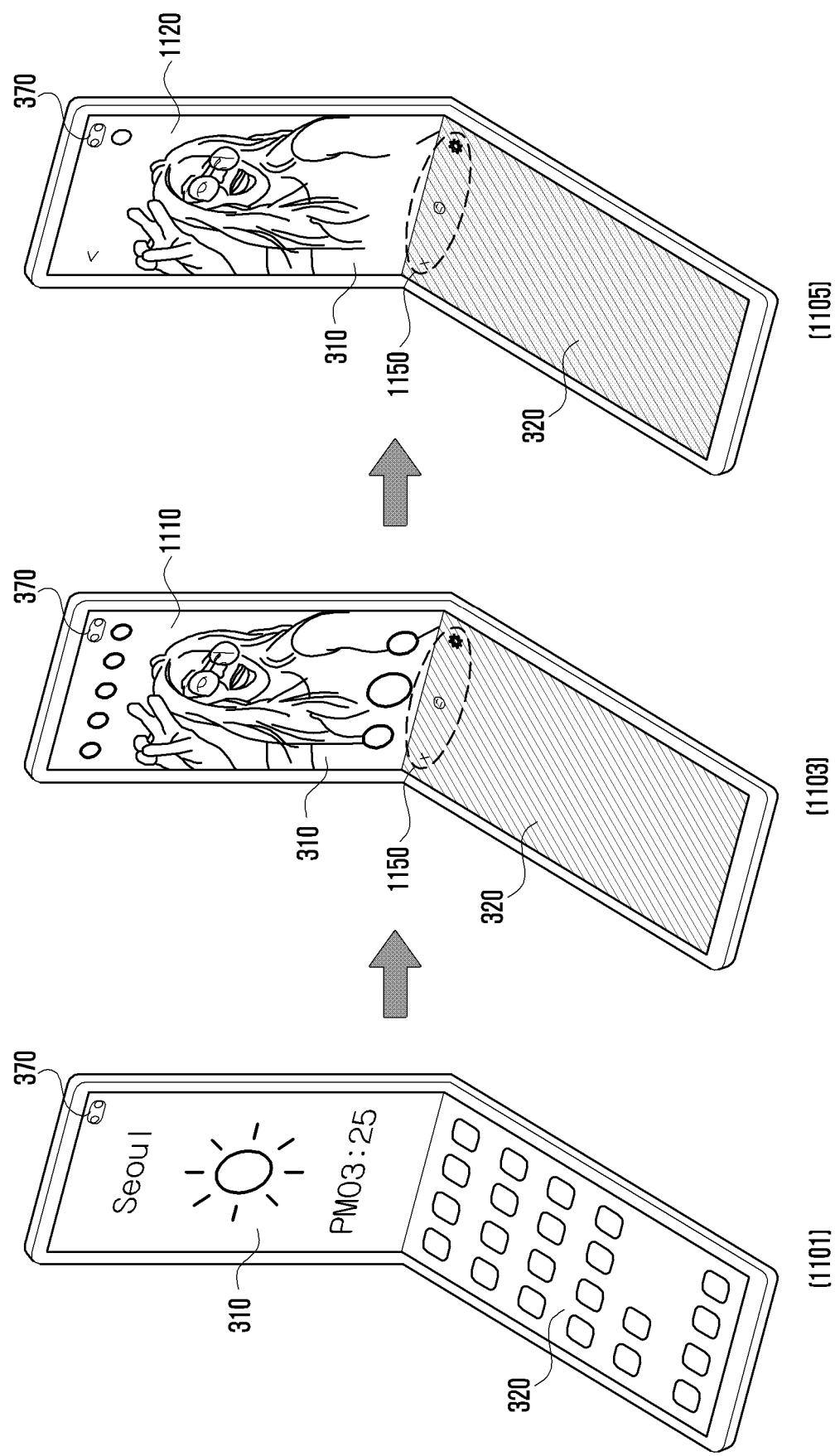
FIG. 11 illustrates a photographing operation of the electronic device in a second state, according to an embodiment.

FIG. 11 illustrates a photographing operation of the electronic device 101 in the second state, according to an embodiment.

In FIG. 11, part [1101] may represent a state (e.g., a second state) in which the electronic device 101 is unfolded at an angle less than a specified angle (e.g., 180 degrees or an angle close thereto). The electronic device 101 may be in a state of displaying a user interface (e.g., a home screen) as a full screen (or a full view) on the display 210. The user may activate the camera in the second state of the electronic device 101 as shown in part [1101]. For example, the user may select (or touch) an icon related to camera activation on the home screen displayed on the display 210, or may operate the electronic device 101 to recognize a designated motion (or gesture) related to camera activation.

Part [1103] of FIG. 11 may illustrate a situation in which the electronic device 101 operates the first region 310 and the second region 320 upon camera activation (e.g., entering the shooting mode) in the second state. Upon activation of the camera in the second state, the electronic device 101 may separate the first region 310 and the second region 320, display a live view (or preview) of the image 1110 (or object) obtained by the camera 370 on the first region 310, and output illumination light through the second region 320 by automatically applying (or setting) a lighting plate. When the second region 320 is set as a lighting plate (or output illumination light), illumination may be generated as a fade-in effect on the second region 320. When operating the second region 320 as a lighting plate, the electronic device 101 may provide (or display) a user interface 1150 (e.g., a GUI) related to lighting function control at least a portion of the second region 320 (e.g., an upper end of the second region 320). The user interface may include a first object (e.g., a lighting plate close button), a second object (e.g., a lighting plate size adjustment button), and/or a third object (e.g., a lighting plate setting button).

Part [1105] of FIG. 11 may show an example of providing an image 1120 as a shooting result after photographing. As shown in part [1105], the second region 320 may be dimmed and illumination through the second region 320 (e.g., a lighting plate) may be stopped. When providing an image 1120 as a result of photographing, the electronic device 101 may turn off a corresponding portion of the second region 320 of the display 210 to stop illumination (or stop lighting mode) through the second region 320. Turning off the second region 320 may include, for example, turning off the light emitter (or a backlight). When turning off the second region, the processor 120 may maintain a specific portion of the second region (e.g., an AOD) to continuously display at least one designated object. The electronic device 101 may store the shooting result during shooting and maintain the live view display and illumination as shown in part [1103] for continuous shooting depending on options of the shooting mode.

Figure 12:
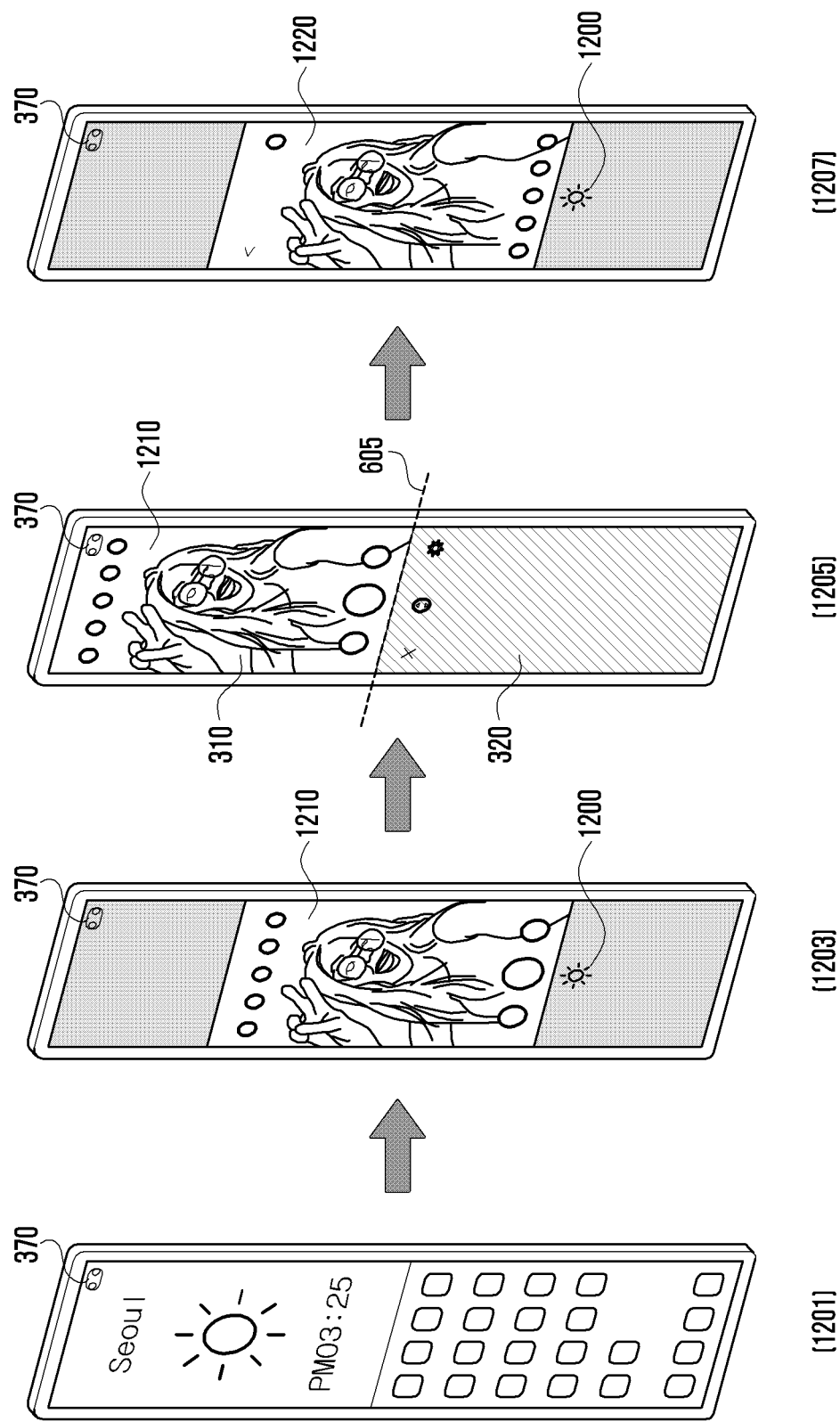
FIG. 12 illustrates a photographing operation of the electronic device in a first state, according to an embodiment.

FIG. 12 illustrates a photographing operation of the electronic device 101 in a first state, according to an embodiment.

In FIG. 12, part [1201] may show a state (e.g., a first state) in which the electronic device 101 is fully unfolded at a specified angle (e.g., 180 degrees or an angle close thereto). The electronic device 101 may display a user interface (e.g., a home screen) as a full screen (or full view) on the display 210. The user may activate the camera in the first state of the electronic device 101 as shown in part [1201]. For example, the user may select (or touch) an icon related to camera activation on the home screen displayed on the display 210, or may operate the electronic device 101 to recognize a designated motion (or gesture) related to camera activation.

As shown in part [1201] of FIG. 12, upon activation of the camera (e.g., entering the shooting mode) in the first state, the electronic device 101 may display a live view as a full screen or at a designated location on the display 210. Upon camera activation in the first state, the electronic device 101 may display a live view (or preview) of an image 1210 (or object) obtained by the camera 370. When displaying a live view, the electronic device 101 may display an object 1200 (e.g., a lighting mode activation button or a lighting plate generation button) for activating the lighting mode using the display 210 at a designated location on the display 210.

Although the object 1200 for activating the lighting mode is illustrated as being located adjacent to the lower center of the live view in the embodiment of FIG. 12, the position of the object 1200 may be varied without being limited thereto. In one embodiment, when the camera is activated in a state where the electronic device 101 is unfolded at a specified angle (e.g., in the first state), unlike the case in the second state, the lighting plate resulting from dividing the display 210 into regions may be not provided.

When the electronic device 101 is unfolded to a preset angle less than the specified angle in the state as shown in part [1203], a transition may occur to the state shown in part [1103] of FIG. 11.

According to a user input for activating the lighting mode in the state as shown in part [1203], the electronic device 101 may make a transition to the state shown in part [1205].

Part [1205] may illustrate a situation where, in response to user selection of the object 1200 for activating the lighting mode in the state shown in part [1203], the electronic device 101 divides the display 210 into a first region 310 and a second region 320 and provides a lighting plate using a portion of the display 210. The electronic device 101 may divide the display 210 into a first region 310 and a second region 320 with respect to a designated folding site. When the object 1200 is selected by the user in the first state, the electronic device 101 may move (or slide) a live view (or a preview) of the image 1210 obtained by the camera 370 to the first region 310 and display it on the first region 310, and output illumination light through the second region 320 by automatically applying (or setting) a lighting plate.

When the electronic device 101 is unfolded to a preset angle less than the specified angle in the state as shown in part [1205], a transition may occur to the state shown in part [1103] of FIG. 11.

Part [1207] may represent an example of providing an image 1220 as a shooting result after photographing. For example, as shown in part [1207], the image 1220 being a shooting result may be provided as a full screen (or a full view) on the display 210 without distinction between the first region 310 and the second region 320. For example, illumination through the second region 320 of the display 210 may be stopped. When displaying the shooting result, an object 1200 for activating the lighting mode may be provided at least one portion (or location) of the display 210. Additionally or alternatively, the electronic device 101 may store the shooting result during shooting and maintain the live view display and illumination as shown in part [1205] for continuous shooting depending on options of the shooting mode.

Figure 13:
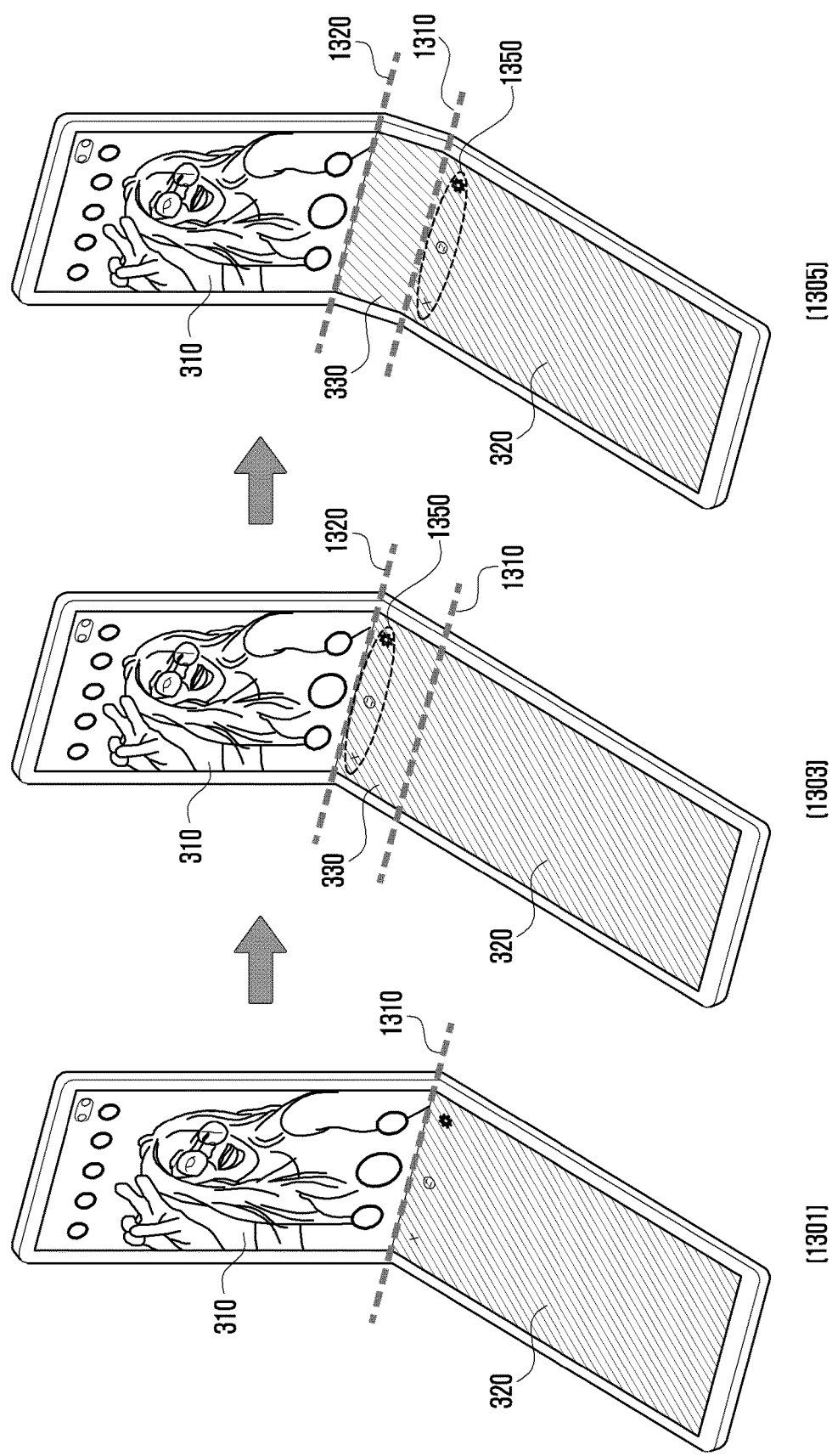
FIG. 13 illustrates folding configurations of the electronic device, according to an embodiment.

FIG. 13 illustrates folding configurations of the electronic device 101, according to an embodiment.

As shown in part [1301] of FIG. 13, the electronic device 101 may operate based on one folding axis 1310 (or folding site or hinge axis), and may separate a first region 310 and a second region 320 based on the folding axis 1310.

As shown in part [1303] and part [1305], the electronic device 101 may be operated based on a plurality of folding axes 1310 and 1320, and may separate a first region 310, a second region 320, and a third region 330 according to the plurality of folding axes 1310 and 1320. Additionally or alternatively, the electronic device 101 may include a plurality of folding axes. For example, the electronic device 101 may include at least two folding axes, and each of the at least two folding axes may be implemented in a form in which the display 210 of the electronic device 101 is divided into multiple sections (e.g., three equal parts or four equal parts).

The electronic device 101 may be folded (or bent) or unfolded with respect to the folding axes 1310 and 1320.

As shown in part [1303] and part [1305] of FIG. 13, the electronic device 101 may output illumination light by applying (or setting) a lighting plate (or illumination) through the second region 320 and the third region 330 divided by the folding axes 1310 and 1320. A first unfolding angle between the first region 310 and the third region 330 divided by the folding axis 1320 may be different from a second unfolding angle between the second region 320 and the third region 330 divided by the folding axis 1310. For example, directions of the second region 320 and the third region 330 toward the lighting plate may be different. The second region 320 and the third region 330 may be operated to output illumination light based on the same settings (e.g., brightness and color temperature), or may be operated to output different illumination light (e.g., in terms of brightness or color temperature) based on different settings.

As shown in part [1303] and part [1305] of FIG. 13, when operating the second region 320 and the third region 330 as a lighting plate, the electronic device 101 may provide (or display) a user interface 1350 (e.g., a GUI) related to the lighting function control at least one portion of the second region 320 or the third region 330 (e.g., an upper end of the second region 320). The user interface 1350 may include a first object (e.g., a lighting plate close button), a second object (e.g., a lighting plate size adjustment button), and/or a third object (e.g., a lighting plate setting button).

As shown in part [1301] or part [1303], when the display 210 is divided into the first region 310 and the second region 320, the user interface 1350 may be provided at a first designated location. As shown in part [1305], when the display 210 is divided into the first region 310, the second region 320, and the third region 330, the user interface 1350 may be provided at a second designated location (e.g., an upper end of the second region 320 (e.g., a lowest region) from the folding axes 1310 and 1320) other than the first designated location.

Figure 14:
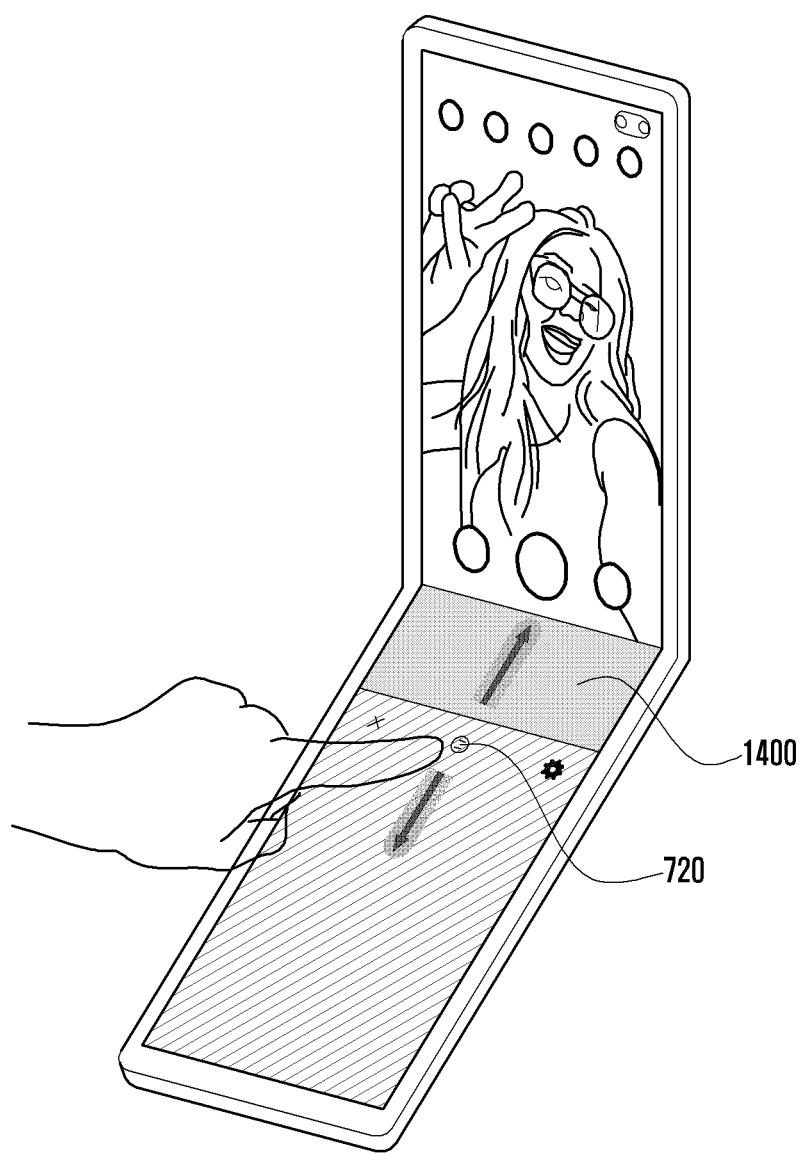
FIGS. 14 and 15 show an example of operating a lighting plate in the electronic device, according to various embodiments.
Figure 15:
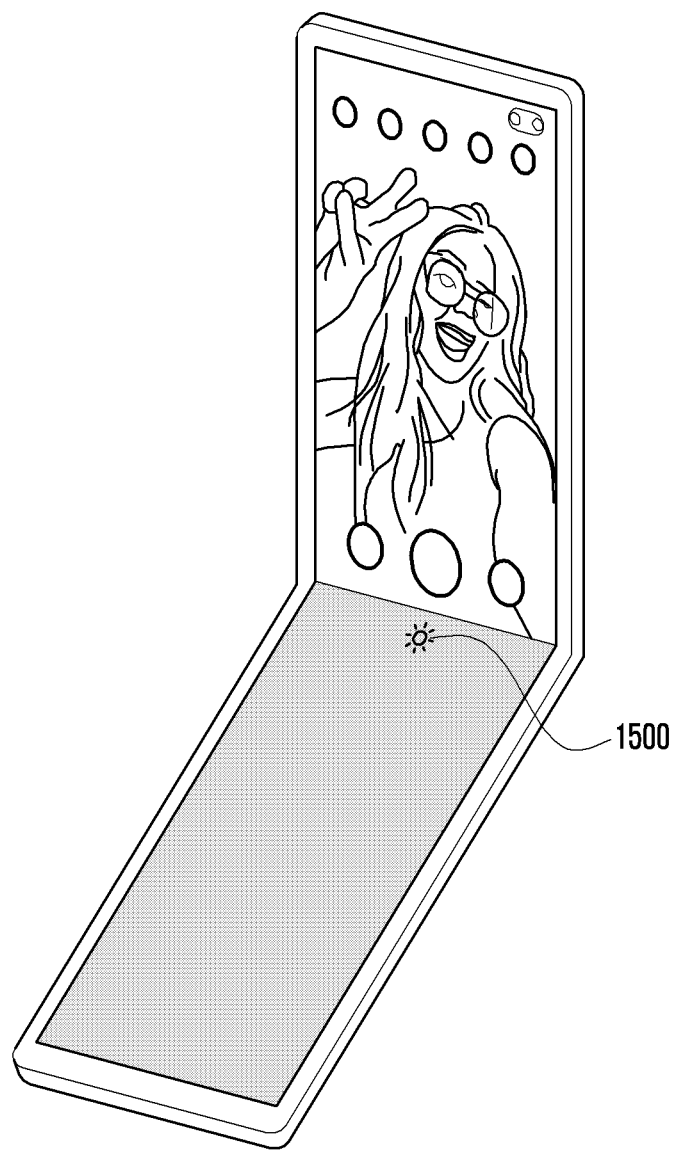

FIGS. 14 and 15 show examples of operating a lighting plate in the electronic device 101, according to various embodiments.

FIG. 14 illustrates an example of adjusting the size of a lighting plate set through a region (e.g., a second region 320) of the display 210 according to a user input. As shown in FIG. 14, the user may manually adjust the size of the lighting plate through vertically dragging while touching a designated object 720 (e.g., a lighting plate size adjustment button) for adjusting the size of the lighting plate. According to a change in the size of the lighting plate (e.g., reduction), the user interface including the designated object 720 may also be moved and displayed in response to the user input.

According to a change in the size of the lighting plate (e.g., a reduction), the remaining region 1400 other than the lighting plate may be dimmed and illumination light may be not output through the remaining region 1400. The electronic device 101 may turn off a corresponding portion of the remaining region 1400 in the second region 320 to stop illumination through the remaining region 1400 other than the lighting plate in the second region 320. Turning-off may include, for example, turning off the light emitter (or a backlight).

FIG. 15 shows an example of adjusting turning on/off (or activation/deactivation) of the lighting plate set through the second region 320 of the display 210 according to a user input. As shown in FIG. 7, the user may turn off the lighting plate by using a designated first object 710 (e.g., a lighting plate close button) to stop illumination through the second region 320. The electronic device 101 may turn off a corresponding portion of the second region 320 of the display 210 to stop illumination (or stop a lighting mode) through the second region 320. Turning off the second region may include, for example, turning off the light emitter (or a backlight). For example, as shown in FIG. 5, the second region 320 may be dimmed to indicate a state where illumination through the second region 320 (e.g., a lighting plate) is stopped.

As shown in FIG. 15, when the second region 320 is turned off, the electronic device 101 may display a designated object 1500 (e.g., a lighting mode activation button or a lighting plate generation button) in the second region (e.g., an AOD). The electronic device 101 may provide an object 1500 for activating the lighting mode when the second region 320 is turned off. Although the object 1500 for activating the lighting mode is depicted as being located adjacent to the lower center of the live view in FIG. 15, without being limited thereto, the designated location of the object 1500 may be varied.

Figure 16A:
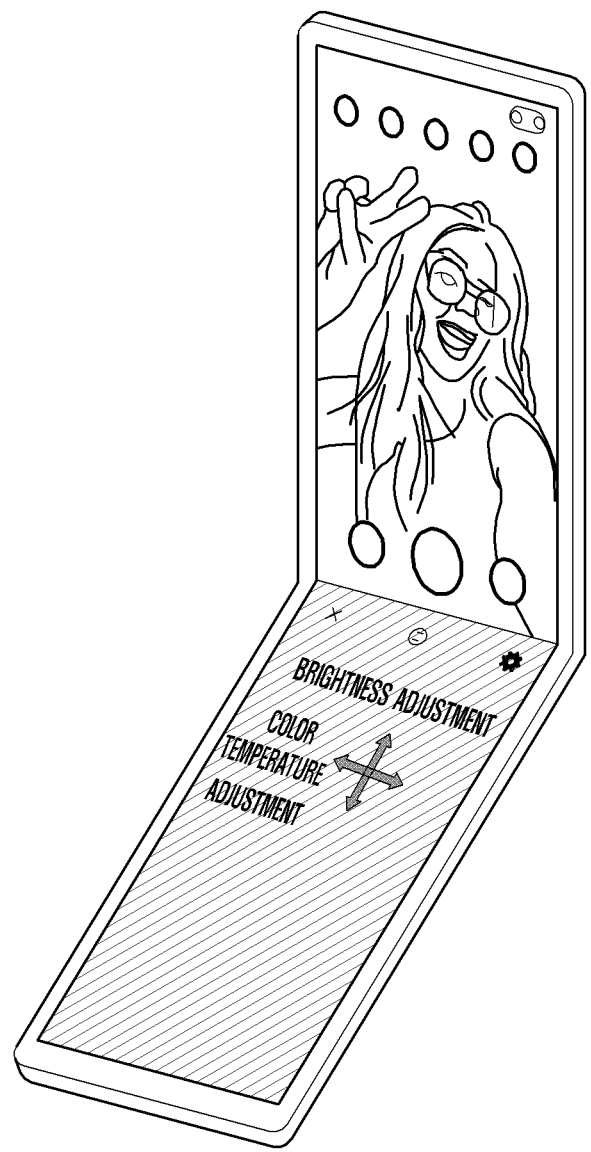
FIGS. 16A, 16B and 16C show examples of changing settings related to lighting in the electronic device, according to an embodiment.
Figure 16B:
Figure 16C:
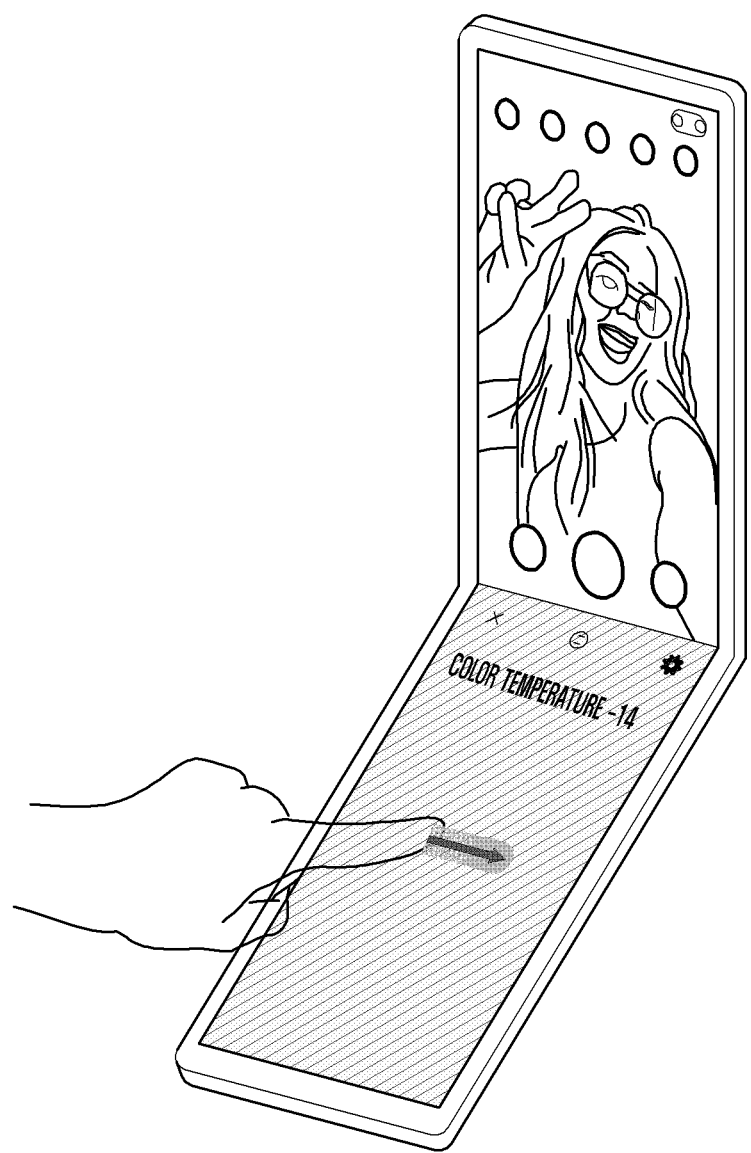

FIGS. 16A, 16B and 16C show examples of changing settings related to lighting in the electronic device 101, according to an embodiment.

As shown in FIG. 16A, the user may adjust various settings of the lighting plate (e.g., a second region) through a user input on the lighting plate region of the electronic device 101. As shown in FIG. 16A, the electronic device 101 may adjust the brightness and/or color temperature related to illumination according to a user input on the lighting plate region. Notification information (or guide information) related to the control of settings illustrated in FIG. 16A may be provided using at least one of visual, tactile, and/or auditory methods. The notification information may be information guiding the user how to adjust the brightness and/or color temperature related to illumination through the illumination plate region.

The notification information related to the setting control illustrated in FIG. 16A may be not displayed according to settings of the electronic device 101. The notification information related to the setting control it illustrated in FIG. 16A may be displayed at the time when the lighting plate is set and may be hidden after a certain period of time. The notification information related to the setting control illustrated in FIG. 16A may be provided on the lighting plate region in response to selecting a designated object (e.g., a lighting plate setting button) of a user interface (e.g., a GUI) related to the lighting function control displayed at least a portion of the lighting plate region. For example, the electronic device 101 may enter a setting mode in response to a user input on a designated object, and may provide notification information and control settings according to a user input in the setting mode.

As shown in FIG. 16B, in the setting mode, the user can adjust the brightness of illumination through the lighting plate by entering an input for adjusting the brightness of illumination (e.g., a vertical sweep or a drag on the lighting plate). In response to a user input (e.g., a vertical sweep), the electronic device 101 may change the brightness of illumination in real time and provide information (or a setting value) about the changed brightness (e.g., a brightness value of 13).

As shown in FIG. 16C, in the setting mode, the user can adjust the color temperature of illumination through the lighting plate by entering an input for adjusting the color temperature of illumination (e.g., a horizontal sweep or drag on the lighting plate). In response to a user input (e.g., a horizontal sweep), the electronic device 101 may change the color temperature of illumination in real time and provide information (or a setting value) about the changed color temperature (e.g., a color temperature value of −14).

The settings related to lighting may be controlled through manual adjustment as illustrated in FIGS. 16A, 16B and 16C. It is also possible to automatically control the settings related to lighting. For example, the electronic device 101 may analyze the surrounding environment (e.g., a light source/brightness in the vicinity) and/or the skin tone of the user's face (e.g., a brightness and/or color of the user's face), and may automatically adjust setting values of lighting in real time so as to capture the best quality image according to a given situation on the basis of at least the surrounding environment and/or the skin tone of the user's face.

When shooting with the camera (e.g., taking a selfie or taking a photograph of the front of a target object (subject)), the electronic device 101 may set one region of the display 210 as a lighting plate and provide illumination light according to the surrounding environment. Hence, the electronic device 101 may automatically capture an image of the target object (e.g., a user's face) with optimum brightness and optimum color. As described in Table 1, below, the electronic device 101 may recognize the target object based on at least one sensor, and may capture an image of the target object with optimum brightness and color correction using the lighting plate based on the recognition result.

TABLE 1

| | Value recognized before shooting (x) | Lighting plate output (y) | | Shooting result (z) |
|---|---|---|---|---|
| Brightness of subject's face (B) | B − 2 (brightness affected by ambient illuminance) | +2 | B | Optimal brightness and optimal color for subject's face |
| Color of subject's face (C) | C + 3 (color affected by ambient color temperature) | −3 | C | |

When the optimal brightness of the face of a subject is denoted by B and the optimal color of the face of the subject is denoted by C, default values of B and C may be stored in the memory 130 of the electronic device 101.

The shooting result for B or C may provide the optimum brightness and optimum color of the subject by adjusting the lighting plate output (y) in response to the value (x) recognized before shooting as illustrated in Equations (1) and (2) below.

$$B = x + y = B \quad (1)$$

$$C = x + y = C \quad (2)$$

With reference to Table 1, Equation (1), and Equation (2), when the brightness of the subject is B and the value recognized before shooting (x) (e.g., a brightness affected by ambient illumination) is B−2, the shooting result (z) can be generated by compensating (e.g., +2) the lighting plate output by the brightness value affected by ambient illumination (e.g., −2). When the color of the subject is C and the value recognized before shooting (x) (e.g., a color affected by ambient color temperature) is C+3, the shooting result (z) can be generated by compensating (e.g., −3) the lighting plate output by the color value affected by color temperature (e.g., +3).

If the value recognized before shooting (x) (e.g., a brightness recognized before shooting (xB) and/or a color temperature recognized before shooting (xC)) changes, the electronic device may continuously automatically adjust the value of the lighting plate output (y) (e.g., a lighting plate output for brightness (yB) and/or a lighting plate output for color temperature (yC)) to provide the same shooting result (z) (e.g., a result for optimal brightness (zB) and/or a result for optimal color (zC)).

Figure 17A:
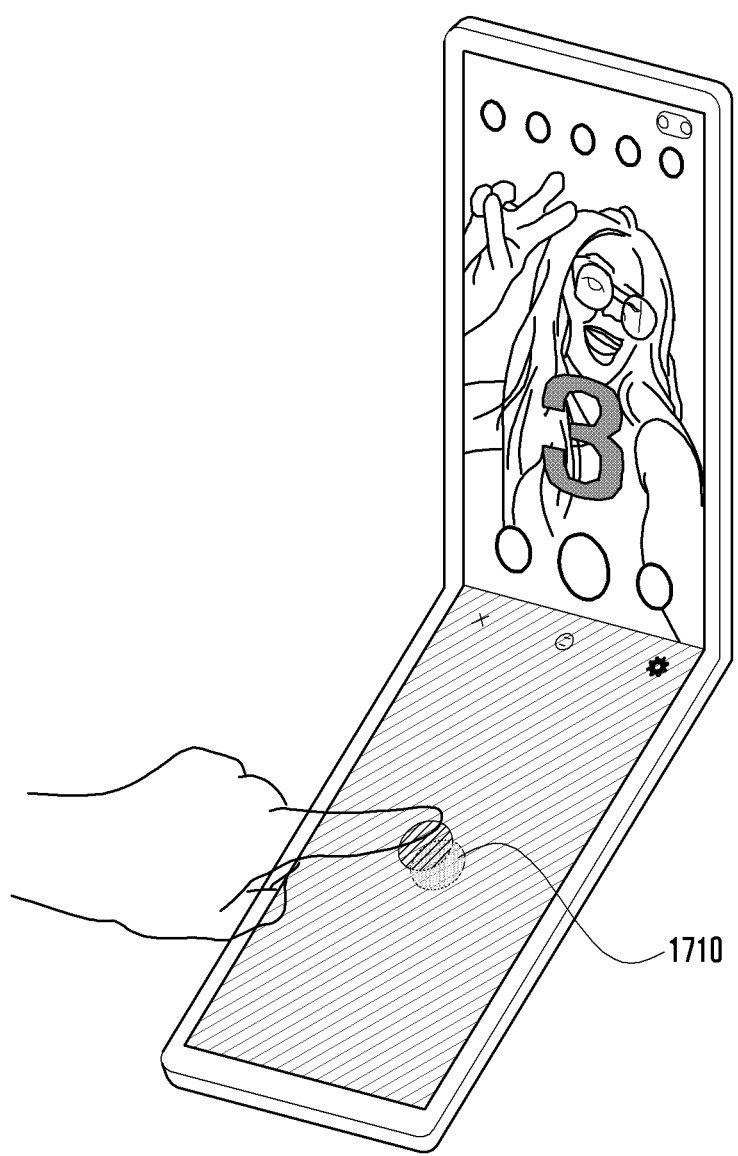
FIGS. 17A and 17B show examples of a photographing operation in the electronic device, according to an embodiment.
Figure 17B:
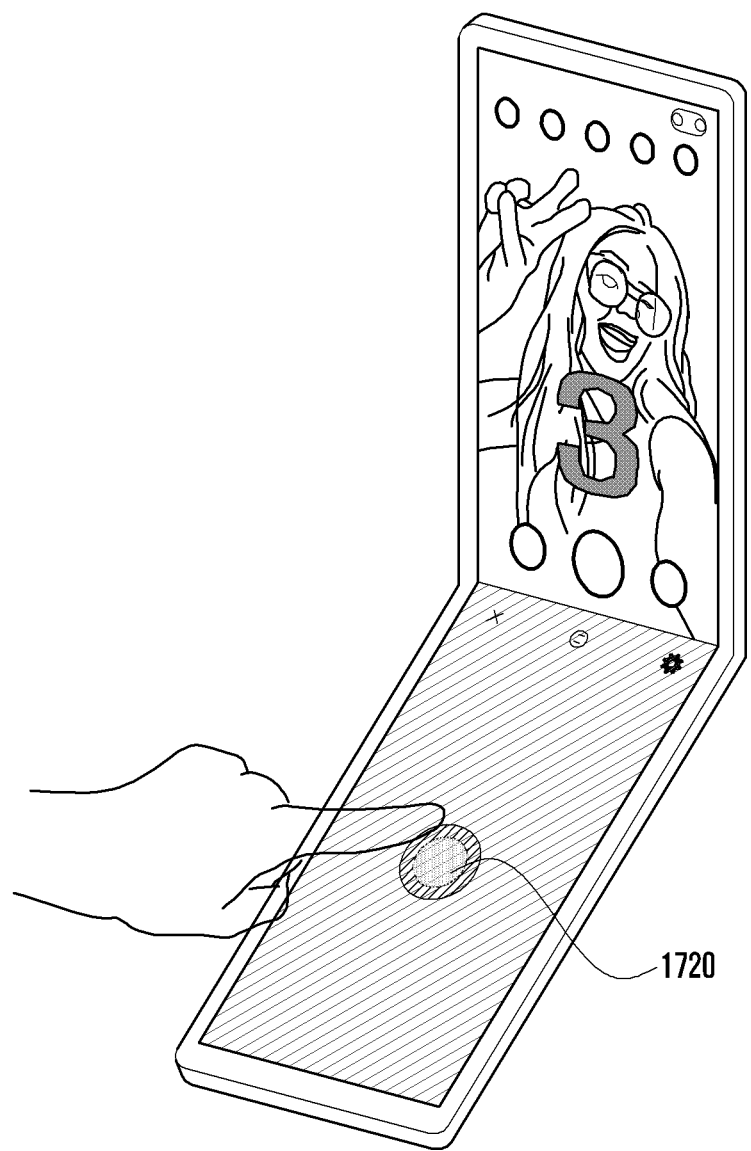

FIGS. 17A and 17B show examples of a photographing operation in the electronic device 101, according to an embodiment.

FIGS. 17A and/or 17B represent examples of providing a shooting function (e.g., a timer-based shooting function) based on a user input on the lighting plate (e.g., a second region). The user may initiate a timer-based shooting by double-tapping the lighting plate 1710, as shown in FIG. 17A, or by long-tapping the lighting plate 1720, as shown in FIG. 17B.

The electronic device 101 may provide different shooting functions for different user inputs on the lighting plate. For example, the electronic device 101 may be configured to perform a 3-second timer-based shooting function for a double tap 1710 (e.g., a first user input), as shown in FIG. 17A, and perform video shooting for a long tap 1720 (e.g., a second user input), as shown in FIG. 17B.

FIGS. 18A, 18B, 18C and 18D show examples of a photographing operation in the electronic device 101, according to an embodiment.

FIGS. 18A, 18B, 18C and 18D illustrate examples of providing a live view according to an operation of rotating the electronic device 101 (e.g., rotating the electronic device 101 in the left or right direction while the user is looking at the display 210).

The electronic device 101 may provide a virtual boundary for a live view (or an expected boundary line of the shooting result) of the image 1800 obtained by the camera, and provide a live view of the image 1800 regardless of the rotation direction of the electronic device 101 (or without rotating the image 1800) based on the virtual boundary. Even when the user rotates the electronic device 101, the electronic device 101 may provide a virtual boundary identical to the boundary of the shooting result and maintain the direction of display without changing the display direction of the image 1800. For example, the user may select portrait fixation or landscape fixation and perform shooting in fixed portrait mode or fixed landscape mode.

Figure 18A:
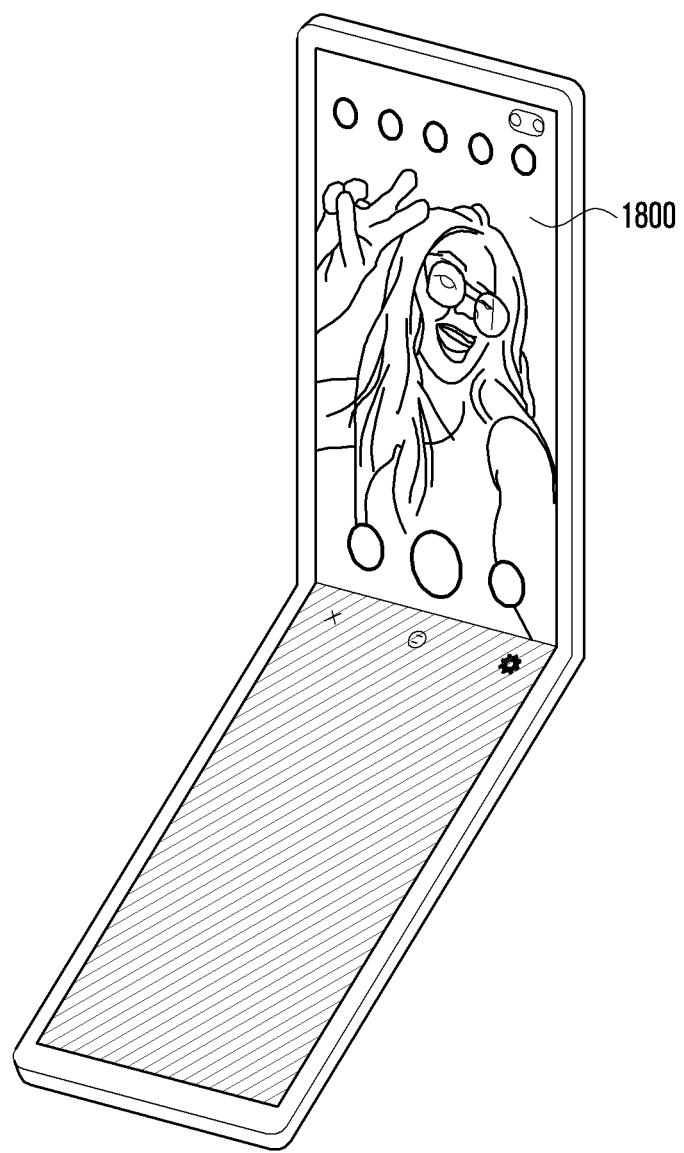
FIGS. 18A, 18B, 18C and 18D show examples of a photographing operation in the electronic device, according to an embodiment.

FIG. 18A shows an example of performing a shooting mode in a state (e.g., a second state) where the electronic device 101 is unfolded at a preset angle less than the specified angle (e.g., 180 degrees or an angle close thereto). For example, the embodiment in FIG. 18A shows an example in which the electronic device 101 divides the display 210 into a first region and a second region in response to activation of the camera (e.g., entering the shooting mode) in the second state or a transition to the second state in the shooting mode. The electronic device 101 may display a live view of the image 1800 obtained by the camera on the first region, and output illumination light by applying a lighting plate through the second region.

Figure 18B:
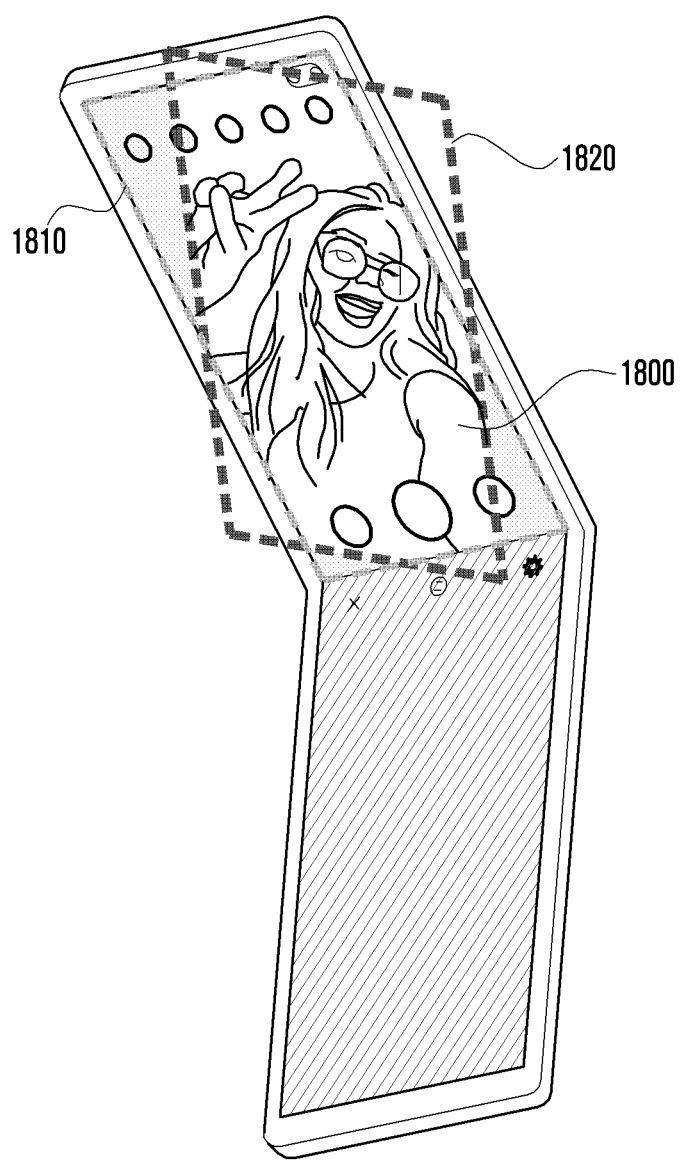
Figure 18C:
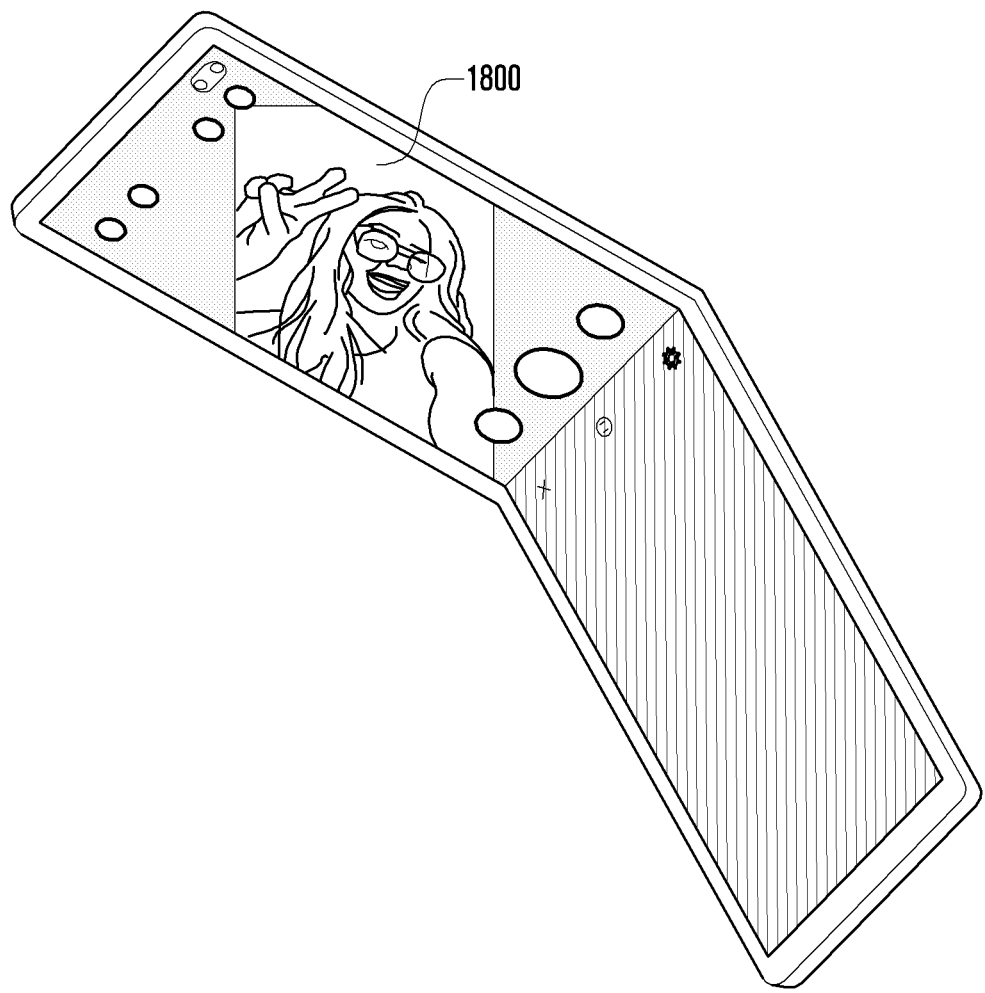
Figure 18D:
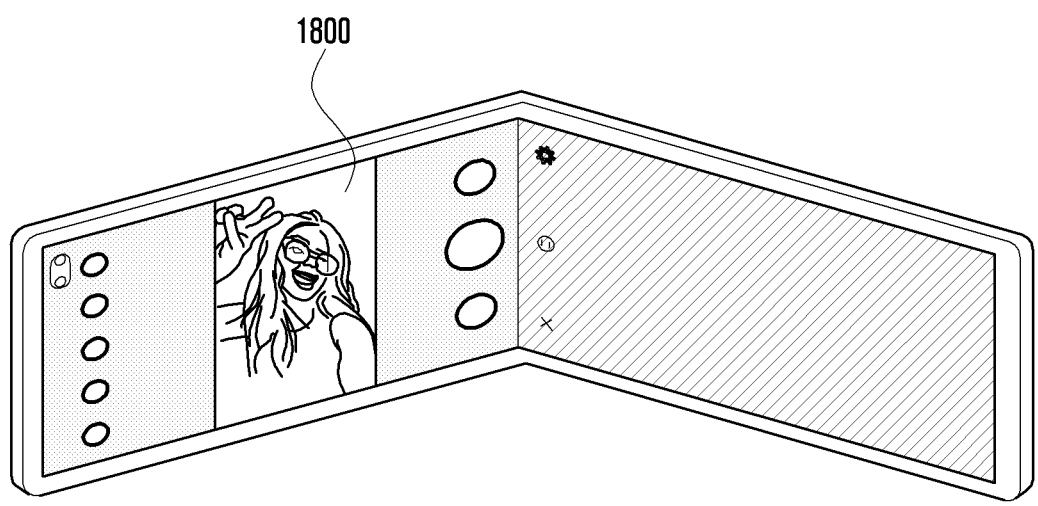

FIGS. 18B and 18C represent a state change in which the electronic device 101 is rotated in a specific direction (e.g., the user rotates the electronic device 101 in the left direction while looking at the display 210). FIG. 18D illustrates a state in which the electronic device 101 is rotated at a specified angle (e.g., 90 degrees or an angle close thereto) in a specific direction.

With reference to FIG. 18B, when being rotated in the state shown in FIG. 18A, the electronic device 101 may set a virtual second boundary 1820 different from the actual first boundary 1810 within which the image 1800 is displayed. The first boundary 1810 may represent, for example, a first display range that can be displayed on the physical display 210 (e.g., a full view of the display 210), and the second boundary 1820 may represent, for example, a second display range in which the image 1800 is substantially displayed (e.g., an expected boundary for shooting result). The second display range may indicate a boundary for displaying the image 1800 while maintaining the second boundary 1820 in terms of verticalness and horizontalness.

As shown in FIGS. 18B, 18C and 18D, the second boundary 1820 may be automatically resized so that the object of the subject (e.g., a user's face) does not deviate from the first boundary 1810 of the display 210. As the size of the second boundary 1820 is adjusted, the size of the live view in which the image 1800 is displayed may also be adjusted. For example, the size of the live view may be changed according to a size corresponding to the second display range of the second boundary 1820 adjusted according to the rotation of the electronic device 101.

As shown in FIGS. 18B, 18C and 18D, as the size of the live view changes, the size of the image 1800 displayed through the live view may also change in sequence, and the shooting result generated during photographing may be the same regardless of the rotation angle of the electronic device 101 for photographing.

While the electronic device 101 is being rotated, the electronic device 101 may continuously recognize the surrounding environment (e.g., a brightness and/or a color of the user's face), and automatically adjust the settings for illumination based on a recognized result so as to continuously provide optimal illumination depending upon a change in the surrounding environment.

Figure 19:
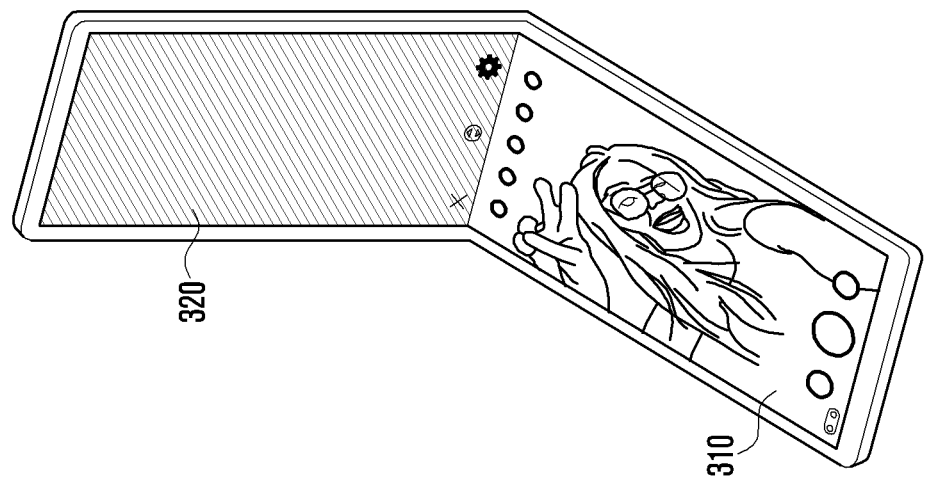
FIG. 19 illustrates a manner of utilizing a first region and a second region based on rotation of the electronic device, according to an embodiment.
Figure 19:
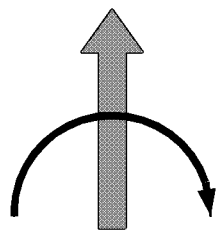
Figure 19:
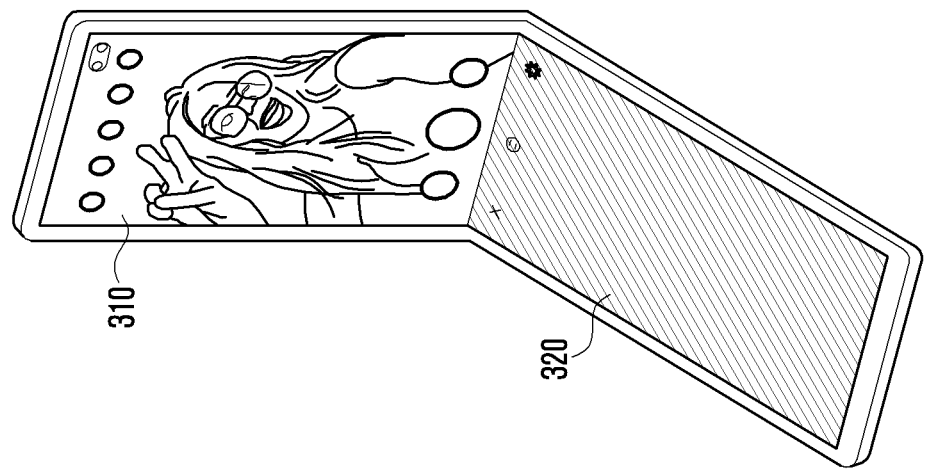

FIG. 19 illustrates a manner of utilizing the first region and the second region based on rotation of the electronic device 101, according to an embodiment.

FIG. 19 illustrates an example in which the first region 310 and the second region 320 are operated when the electronic device 101 is rotated by a specified angle or more (e.g., 180 degrees or an angle close thereto).

The user may perform shooting by rotating the electronic device 101 by a specified angle or more and changing the position of the lighting plate through the second region 320 from the lower end position to the upper end position. While the electronic device 101 is being rotated, the electronic device 101 may automatically adjust the size of the live view according to the rotation angle and maintain the display direction of the live view image on the first region 310 as it is as shown in FIGS. 18B, 18C and 18D.

Figure 20:
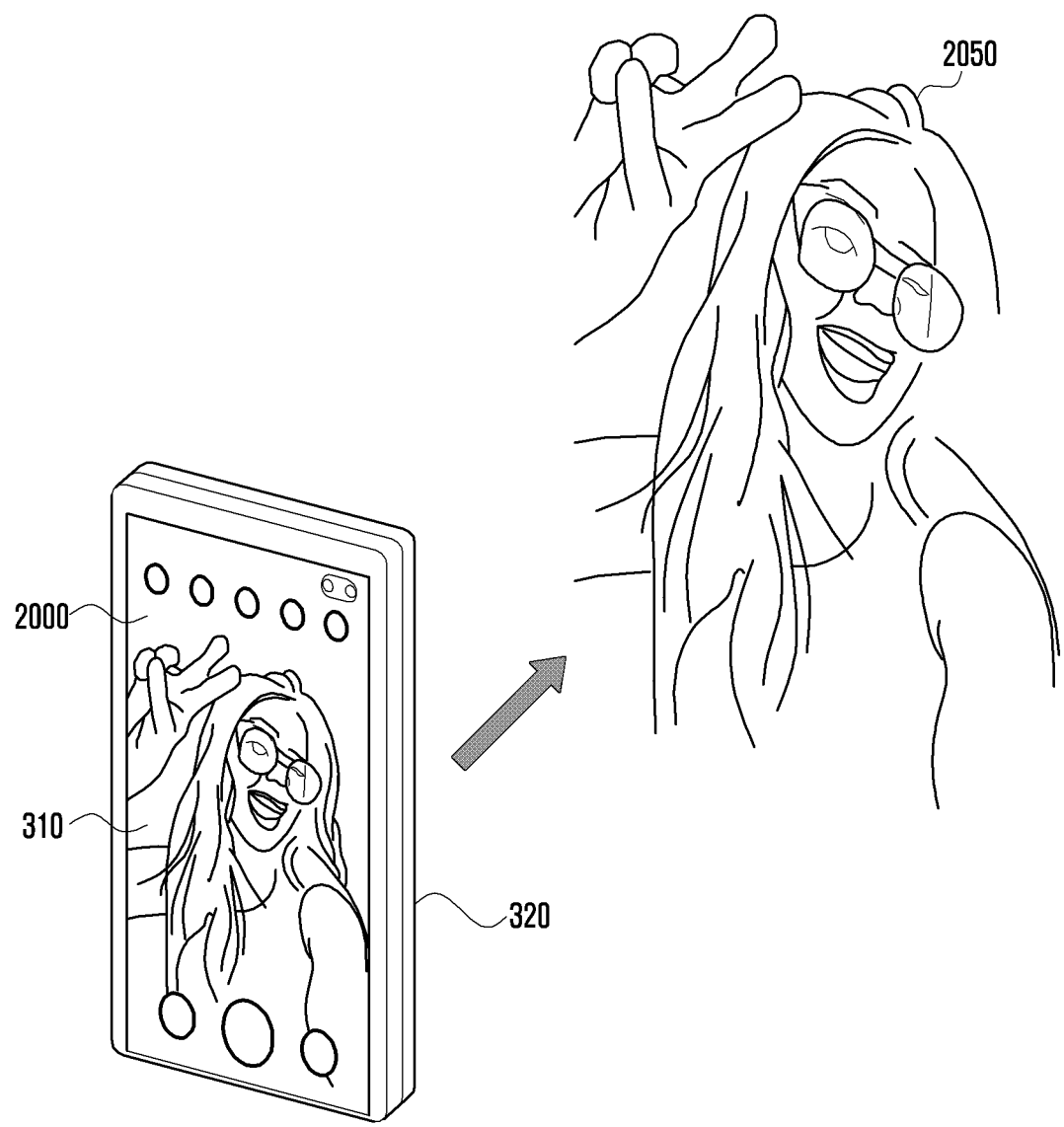
FIG. 20 illustrates an example of an electronic device and a photographing operation thereof, according to an embodiment.

FIG. 20 illustrates an example of the electronic device 101 and a photographing operation thereof, according to an embodiment.

FIG. 20 shows an example in which the display 210 is divided into a first region 310 (e.g., a first display surface, a front region, or a region when folded) and a second region 320 (e.g., a second display surface, a rear region, or a front region when folded).

When folded (e.g., a folded state based on an out-folding scheme), the electronic device 101 may provide a relatively small display by dividing the display 201 into a first region 310 and a second region 320 respectively constituting the front surface and the rear surface with respect to the folding site (e.g., a folding axis); and when unfolded (e.g., in an unfolded state), the electronic device 101 may operate the first region 310 and the second region 320 as a single surface to provide a relatively large display.

Referring to FIG. 20, the first region 310 and the second region 320 may be configured to face away from each other in the folded state and may be configured to face in the same direction in the unfolded state.

The electronic device 101 may display an image 2000 of a subject 2050 (or a target object) obtained by the camera (e.g., a rear camera) on the first region 310, and may provide illumination of the camera through the second region 320. For example, in the shooting mode, the electronic device 101 may separate the first region 310 and the second region 320, display a live view of the image 2000 obtained by the camera on the first region 310, and provide the second region 320 facing in a different direction from the first region 310 as a lighting plate for illumination of the camera.

Figure 21:
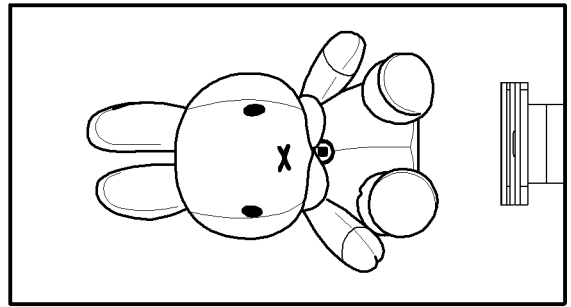
FIG. 21 depicts the result of an experiment utilizing the electronic device, according to an embodiment.
Figure 21:
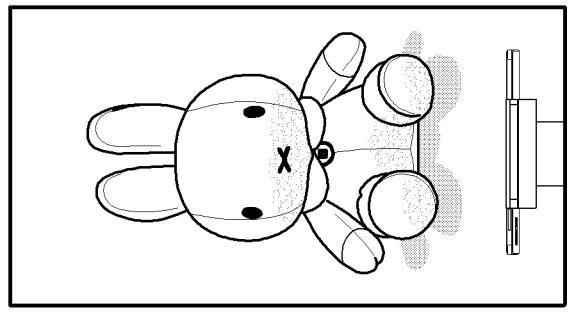
Figure 21:
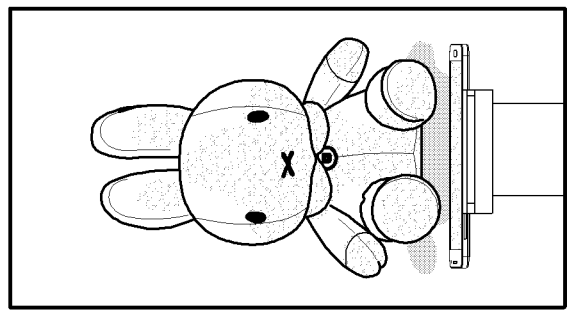
Figure 21:
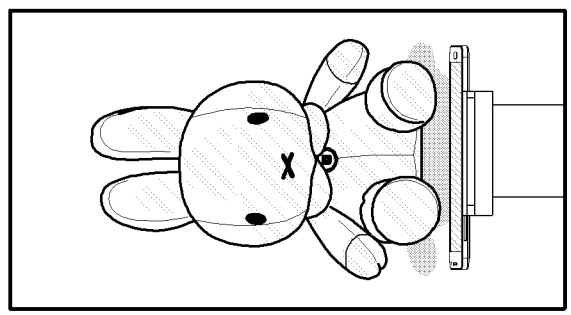
Figure 21:
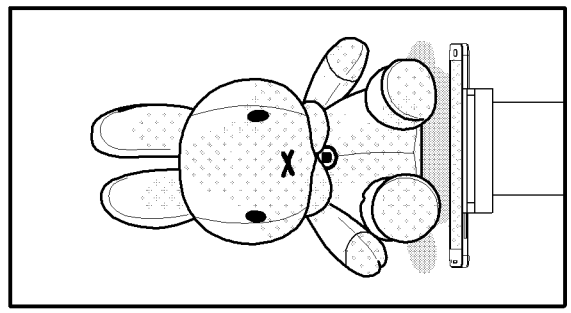

FIG. 21 depicts the result of an experiment utilizing the electronic device 101, according to an embodiment.

FIG. 21 may illustrate a case where at least a region of the display 210 is used as a lighting plate for photographing in a specific shooting environment (e.g., indoors with regular living room lighting in the afternoon).

In FIG. 21, part [2101] may represent a result screen when the lighting plate is not applied (e.g., without lighting) and default settings are used. Parts [2103] to [2109] may represent result screens when a second region 320 of the display 210 is applied as a lighting plate (e.g., when there is lighting) with different settings (e.g., a color setting and/or a brightness of lighting setting). For example, part [2103] may show an example of providing first lighting (e.g., white lighting), part [2105] may show an example of providing first lighting (e.g., white lighting) closer to the subject, part [2107] may show an example of providing second lighting (e.g., yellow lighting), and part [2109] may show an example of providing third lighting (e.g., blue lighting).

In FIG. 21, the degree of difference between lightings is indicated by hatching, and the resulting screen may be obtained based on a difference in a brightness and/or a color in correspondence with each lighting. In part [2103], a relatively bright image may be obtained based on the first lighting in comparison to part [2101]. In part [2105], shooting is performed closer to the subject by using the first lighting, and a relatively bright image may be obtained in comparison to part [2103]. In part [2107], yellow lighting (or another lighting color) may be included in the subject by the second lighting, and shooting may be performed with a corresponding brightness. In part [2109], blue lighting (or another lighting color) may be included in the subject by the third lighting, and shooting may be performed with a corresponding brightness.

The first lighting, the second lighting, or the third lighting may be automatically set and provided based on the optimal brightness and optimal color of a subject (e.g., a user's face). For example, the electronic device 101 may support shooting by recognizing the subject (e.g., a user's face) based on at least one sensor and correcting it through illumination of the optimum brightness and optimum color based on the lighting plate. Thereby, it is possible to improve the quality of shooting results in a dark lighting environment or regardless of the surrounding environment. Additionally, as shown in FIG. 21, it is possible to perform shooting with various lighting effects more suitable for user needs in comparison to shooting without application of a lighting plate.

According to an embodiment, an operation method of an electronic device including a foldable display may include detecting activation of a camera in the unfolded state of the foldable display with a specified angle; identifying a first region and a second region in the foldable display in response to detecting camera activation; displaying a live view for the camera based on the first region; and outputting illumination light based on the second region.

The operation method may include detecting a transition of the foldable display to the unfolded state with an angle less than the specified angle in the shooting mode; and dividing the foldable display into the first region and the second region in response to detecting the transition to the unfolded state.

The operation method may include detecting a user input for activating the camera; identifying the state of the foldable display in response to the user input; displaying a live view of an object obtained by the camera on a designated region of the foldable display based on a first state of the foldable display; and dividing the foldable display into a first region for a live view and a second region for a lighting plate with respect to the folding site based on a second state of the foldable display.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:
1. An electronic device comprising:
a foldable display;
a camera;
a processor; and
a memory operatively connected to the processor,
wherein the memory stores instructions that cause, when executed, the processor to:
identify a state of the electronic device;
receive a user input for activating the camera;
if the state of the electronic device is in a fully unfolded state of the foldable display when the camera is activated, display a live view of an image obtained through the camera on a screen of the foldable display in the fully unfolded state;
in response to the state of the electronic device changing from the fully unfolded state to a partially unfolded state of the foldable display with an angle relative to a folding site, identify a first region and a second region of the foldable display divided according to the folding site; and
while in the partially unfolded state and in a camera mode for taking a selfie, display the live view of the image obtained through the camera on the first region of the foldable display and use the second region of the foldable display to illuminate light for illuminating a face of a person taking a selfie.
2. The electronic device of claim 1, wherein the instructions are further configured to cause the processor to:

detect a transition of the foldable display to the partially unfolded state with the angle less than a specified angle in the camera mode; and divide the foldable display into the first region and the second region based on the folding site in response to detecting the transition to the unfolded state.

3. The electronic device of claim 1, wherein the foldable display includes at least one folding axis and is divided into at least two regions based on the at least one folding axis, and wherein the instructions are further configured to cause the processor to identify the first region and the second region based on the at least one folding axis.

4. The electronic device of claim 3, wherein a direction of the camera is different from a direction of illuminating light from the second region.

5. The electronic device of claim 1, wherein the instructions are further configured to cause the processor to:

identify a state of the foldable display in response to the user input;

display a live view of an object obtained by the camera through a designated region of the foldable display based on a first state of the foldable display; and divide the foldable display into the first region for the live view and the second region for a lighting plate with respect to the folding site based on a second state of the foldable display.

6. The electronic device of claim 1, wherein the instructions are further configured to cause the processor to provide a transition animation when separating the first region and the second region.

7. The electronic device of claim 1, wherein the instructions are further configured to cause the processor to:

move the live view in a slide manner to the first region and display it thereon; and provide a user interface related to a lighting plate in a fade-in manner on the second region.

8. The electronic device of claim 1, wherein the instructions are further configured to cause the processor to generate a lighting plate by using at least two regions based on at least two folding sites.

9. The electronic device of claim 8, wherein the instructions are further configured to cause the processor to provide different illumination light for the at least two regions.

10. The electronic device of claim 1, wherein the instructions are further configured to cause the processor to provide a shooting function in response to a user input on the second region.

11. The electronic device of claim 1, wherein the instructions are further configured to cause the processor to provide a virtual boundary identical to a boundary of a shooting result regardless of a rotation direction of the electronic device in response to the electronic device being rotated.

12. The electronic device of claim 1, wherein the instructions are further configured to cause the processor to:

divide the foldable display into a first region and a second region when the electronic device is in an unfolded state with an angle less than a specified angle and enter a camera mode;

display a live view of an image obtained by the camera on the first region; and set the second region as a lighting plate for illumination of the camera.

13. The electronic device of claim 12, wherein the instructions are further configured to cause the processor to provide a user interface for operating the lighting plate on the second region.

14. The electronic device of claim 12, wherein the instructions are further configured to cause the processor to provide a user interface for operating the lighting plate on the lighting plate while outputting illumination light through the second region.

15. The electronic device of claim 1, wherein the instructions are further configured to cause the processor to:

detect a user input for a specified object in the partially unfolded state of the electronic device with the angle relative to the folding site; and divide the foldable display into the first region and the second region in response to the user input.

16. An operation method of an electronic device including a foldable display, the operation method comprising:

identifying a state of the electronic device;

receiving a user input for activating a camera;

if the state of the electronic device is in a fully unfolded state of the foldable display when the camera is activated, displaying a live view of an image obtained through the camera on a screen of the foldable display in the fully unfolded state;

in response to the state of the electronic device changing from the fully unfolded state to a partially unfolded state of the foldable display with an angle relative to a folding site, identifying a first region and a second region of the foldable display divided according to the folding site; and while in the partially unfolded state and in a camera mode for taking a selfie, displaying the live view of the image obtained through the camera on the first region of the foldable display and using the second region of the foldable display to illuminate light for illuminating a face of a person taking a selfie.

17. The operation method of claim 16, further comprising:

detecting a transition of the foldable display to the partially unfolded state with the angle less than a specified angle in the camera mode; and dividing the foldable display into the first region and the second region based on the folding site in response to detecting the transition to the unfolded state.

18. The operation method of claim 16, further comprising:

identifying a state of the foldable display in response to the user input;

displaying a live view of an object obtained by the camera on a designated region of the foldable display based on a first state of the foldable display; and dividing the foldable display into a first region for a live view and a second region for a lighting plate with respect to the folding site based on a second state of the foldable display.

* * * * *